US012675241B2

(12) United States Patent
Qi et al.

(10) Patent No.: US 12,675,241 B2
(45) Date of Patent: Jul. 7, 2026

(54) MEMORY SYSTEMS, OPERATING METHODS FOR MEMORY SYSTEMS, CONTROLLER AND STORAGE MEDIUM

(71) Applicant: Yangtze Memory Technologies Co., Ltd., Wuhan (CN)

(72) Inventors: Wei Qi, Wuhan (CN); Da Li, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 125 days.

(21) Appl. No.: 18/826,515

(22) Filed: Sep. 6, 2024

(65) Prior Publication Data

US 2025/0335124 A1     Oct. 30, 2025

(30) Foreign Application Priority Data

Apr. 28, 2024    (CN) .......................... 202410525565.5

(51) Int. Cl.
*G11C 11/34* (2006.01)
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 2/0604; G06F 3/0679
See application file for complete search history.

(56) References Cited

U.S. PATENT DOCUMENTS

| | | | | |
|---|---|---|---|---|
| 8,933,502 | B2 * | 1/2015 | Higashitani ........ | G11C 16/0483 257/326 |
| 9,025,375 | B2 * | 5/2015 | Chang ................ | G11C 16/0483 365/185.11 |
| 9,058,878 | B2 * | 6/2015 | Aritome .............. | G11C 11/5642 |
| 9,978,459 | B2 * | 5/2018 | Huh ........................ | G11C 29/52 |
| 10,229,749 | B2 * | 3/2019 | Oh ........................ | G11C 11/5642 |
| 10,381,090 | B2 * | 8/2019 | Oh .................... | G11C 29/50004 |
| 10,566,066 | B2 * | 2/2020 | So .......................... | G11C 16/26 |
| 10,755,785 | B2 * | 8/2020 | Hong ................. | G11C 11/4093 |
| 10,991,432 | B2 * | 4/2021 | Choo ................. | G11C 11/5628 |
| 12,112,802 | B2 * | 10/2024 | Li ....................... | G11C 16/0433 |
| 2012/0170378 | A1 * | 7/2012 | Aritome ............. | G11C 11/5642 365/185.24 |

* cited by examiner

*Primary Examiner* — Viet Q Nguyen
(74) *Attorney, Agent, or Firm* — Hanley, Flight & Zimmerman, LLC

(57) ABSTRACT

The present application provides a memory system, a method for operating the memory system, a controller and a storage medium. The memory system includes: a memory device and a controller; the controller is configured to send a read command to the memory device; the memory device is configured to read data stored in a first memory cell in the memory device according to the read command; the first memory cell and the second memory cell are located in the same memory string; the second memory cell is a memory cell that has not yet been written with data; the controller is further configured to send a write command to the memory device; the memory device is further configured to write data read from the first memory cell to the second memory cell according to the write command.

20 Claims, 19 Drawing Sheets

508

900

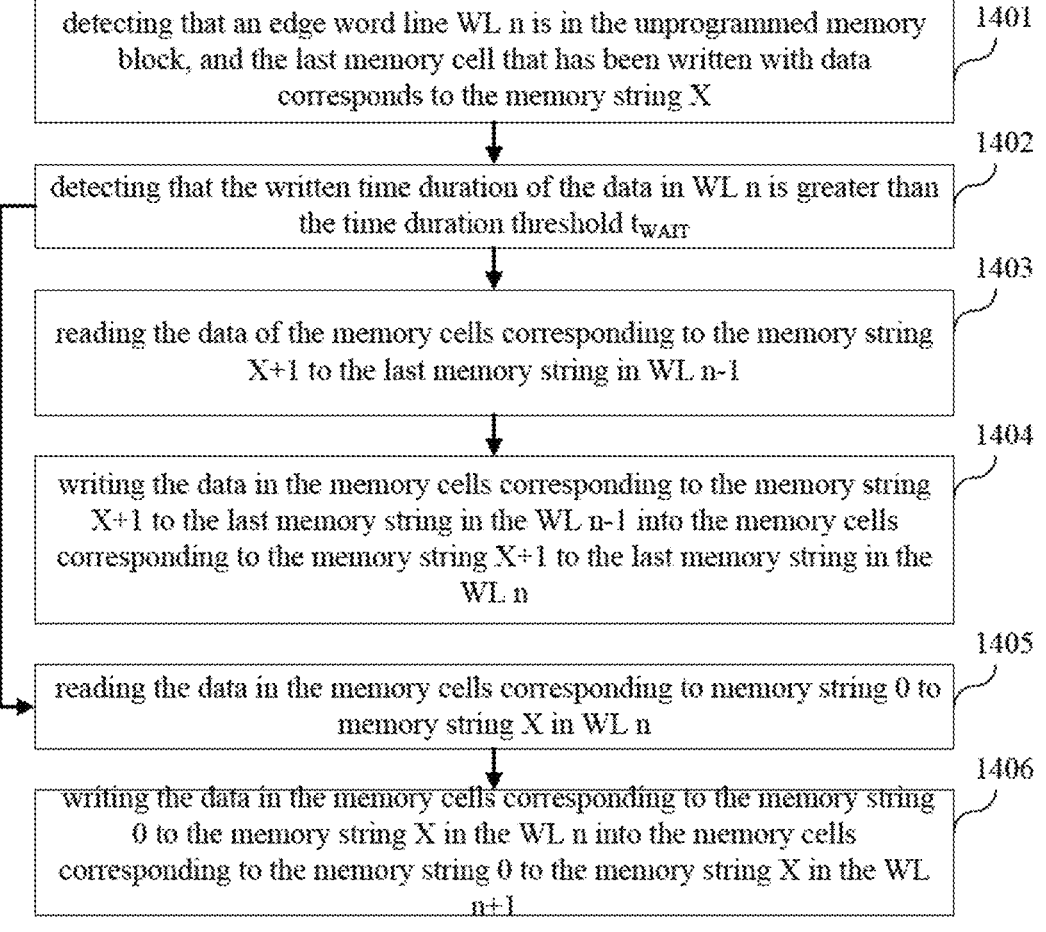

detecting that an edge word line WL n is in the unprogrammed memory block, and the last memory cell that has been written with data corresponds to the memory string X — 1401 detecting that the written time duration of the data in WL n is greater than the time duration threshold $t_{WAIT}$ — 1402 reading the data of the memory cells corresponding to the memory string X+1 to the last memory string in WL n-1 — 1403 writing the data in the memory cells corresponding to the memory string X+1 to the last memory string in the WL n-1 into the memory cells corresponding to the memory string X+1 to the last memory string in the WL n — 1404 reading the data in the memory cells corresponding to memory string 0 to memory string X in WL n — 1405 writing the data in the memory cells corresponding to the memory string 0 to the memory string X in the WL n into the memory cells corresponding to the memory string 0 to the memory string X in the WL n+1 — 1406

FIG. 14

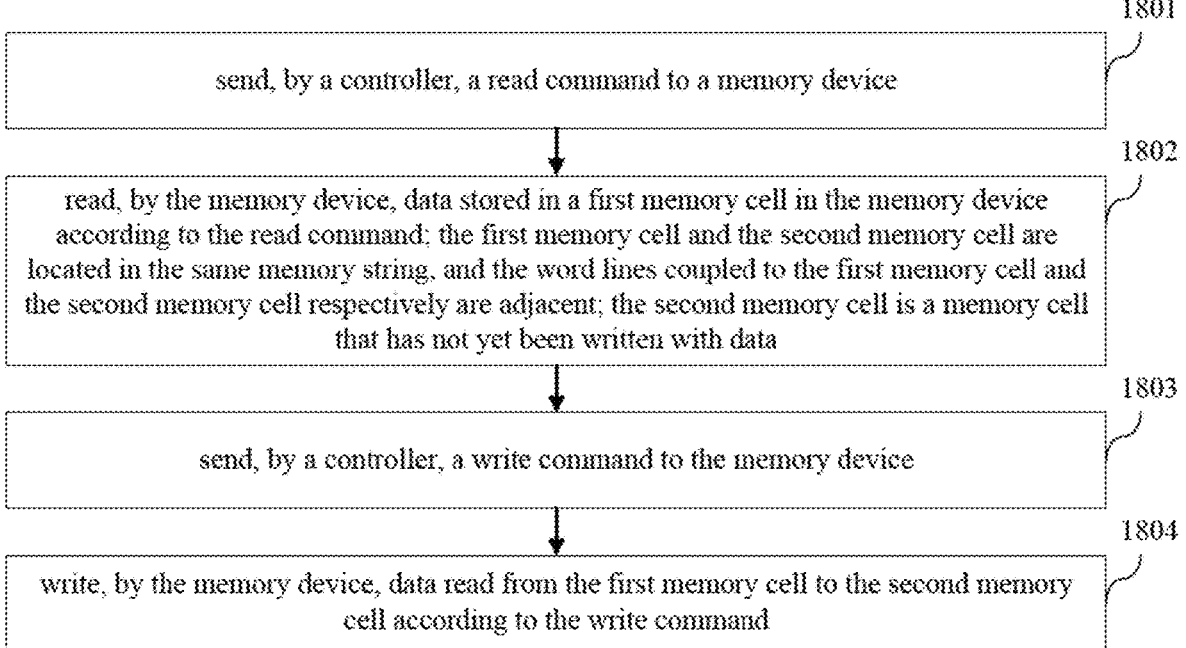

1801 send, by a controller, a read command to a memory device

1802 read, by the memory device, data stored in a first memory cell in the memory device according to the read command; the first memory cell and the second memory cell are located in the same memory string, and the word lines coupled to the first memory cell and the second memory cell respectively are adjacent; the second memory cell is a memory cell that has not yet been written with data

1803 send, by a controller, a write command to the memory device

1804 write, by the memory device, data read from the first memory cell to the second memory cell according to the write command

FIG. 18

MEMORY SYSTEMS, OPERATING METHODS FOR MEMORY SYSTEMS, CONTROLLER AND STORAGE MEDIUM

CROSS-REFERENCE TO RELATED APPLICATIONS

This application claims priority to and the benefit of Chinese Patent Application 202410525565.5, filed on Apr. 28, 2024, which is hereby incorporated by reference in its entirety.

FIELD OF TECHNOLOGY

The present application relates to the field of storage technology, and in particular to memory systems, operating methods for a memory systems, controllers and storage media.

BACKGROUND

In memory products such as NAND, data retention performance is an important indicator to measure the performance of storage products.

BRIEF DESCRIPTION OF THE DRAWINGS

In order to more clearly illustrate the technical solutions in the examples of the present application, the accompanying drawings that need to be used in the description of the examples will be briefly introduced below, and apparently, the accompanying drawings in the following description are only some examples of the application, and for those skilled in the art, other drawings may also be obtained according to these accompanying drawings without any creative effort.

FIG. 14 is a flow chart of another read and write operation involved in an example of the present application;

FIG. 18 is a flowchart of a method for operating a memory system provided by an illustrated example of the present application;

DETAILED DESCRIPTION

The implementations of the present application will be described in further detail below with reference to the accompanying drawings.

The computer system provided in the example of the present application may include a host and a memory system. The memory system may include 3D memory device, e.g., 3D NAND flash.

When a program state difference between two adjacent memory cells in a same memory string is large, there will be a relatively obvious lateral migration phenomenon of electrons, therefore, for data blocks not fully written with data in the memory device, the data retention performance of the edge word lines is poor.

Figure 1:
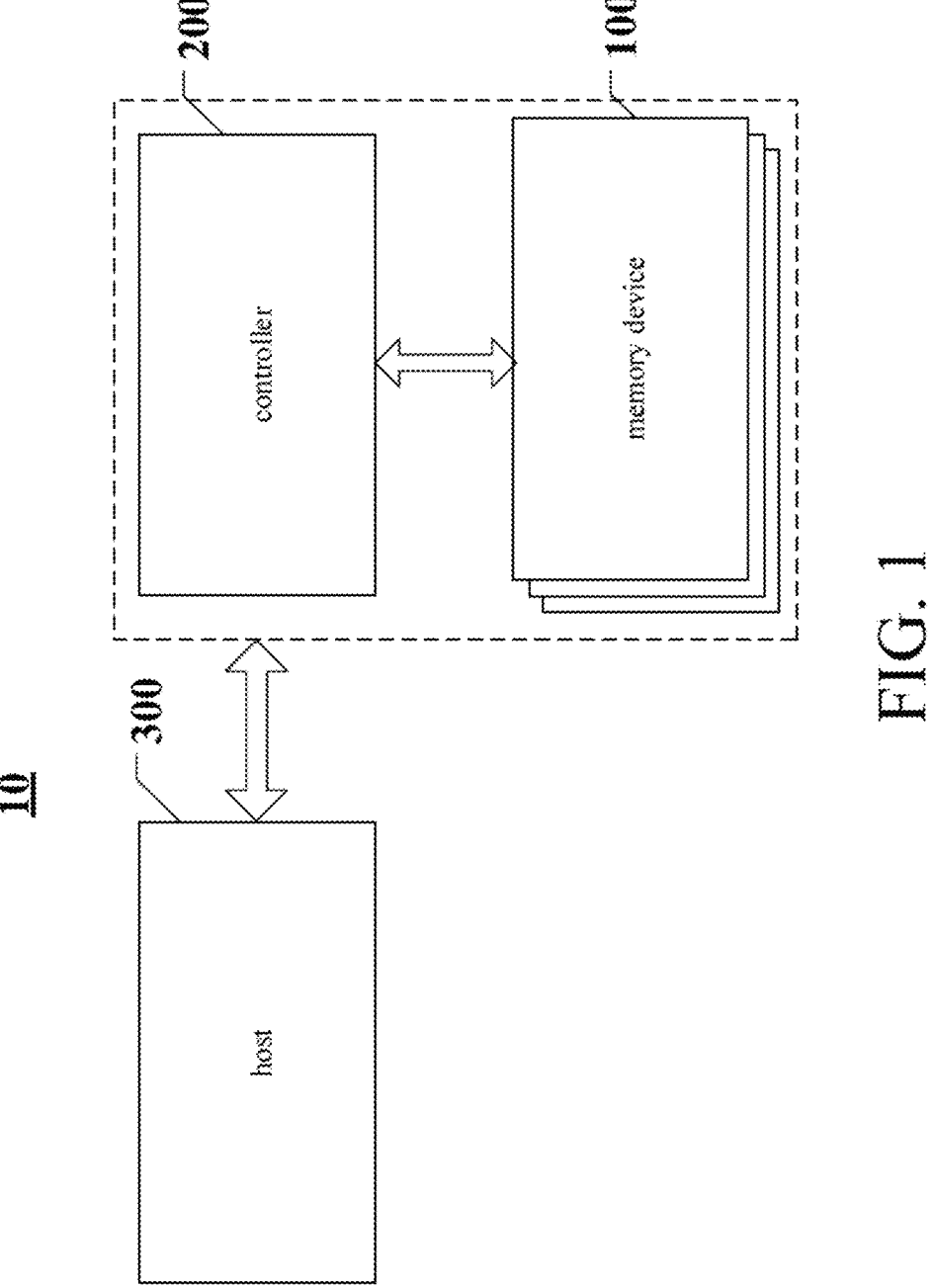
FIG. 1 is a schematic diagram of a computer system provided by an example of the present application.

FIG. 1 is a schematic diagram of a computer system provided by an example of the present application. As shown in FIG. 1, the computer system 10 includes: one or more memories 100, and a controller 200 coupled to the memories 100 and configured to control the memories 100. The controller 200 may also be referred to as a memory controller.

The controller 200 may be configured to control operations performed by the memory device 100. For example, operations of read, erase, and program. The controller 200 may be further configured to manage various functions related to data stored or to be stored in memory device 100, including but not limited to bad block management, garbage collection, logical-to-physical address translation, wear leveling, etc. Optionally, the memory controller 106 may be further configured to process error correction code (ECC) related to data read from or written to memory device 100. The controller 200 may also perform any other suitable functions. For example, formatting the memory 104.

The controller 200 may communicate with external devices according to a particular communication protocol. In some examples, the controller 200 may communicate with external devices through at least one of various interface protocols. The interface protocol may be Universal Serial Bus USB protocol, Multi-Media card (MMC) protocol, Peripheral Component Interconnect (PCI) protocol, PCI Express (PCI-E) protocol, Advanced Technology Attachment (ATA) protocol, Serial ATA protocol, Parallel ATA protocol, Small Computer System Interface (SCSI) protocol, Enhanced Small Disk Interface (ESDI) protocol, Integrated Development Environment (IDE) protocol, Fire wire protocol, etc.

In an example, the controller 200 and one or more memories 100 may be integrated into various types of electronic devices. The electronic device 100 may be a mobile phone, a desktop computer, a laptop computer, a tablet, a vehicle computer, a gaming console, a printer, a positioning device, a wearable electronic device, a smart sensor, a Virtual Reality (VR) device, an Augmented Reality (AR) device, or any other suitable electronic devices having memory device therein. In this scenario, as shown in FIG. 1, the computer system 10 further includes a host 300. The controller 200 is coupled to a host 300. The controller 200 may manage data stored in the memory device 100 and communicate with the host 300 to implement functions of the aforementioned electronic devices.

In other examples, the controller 200 and one or more memories 100 may be integrated into various types of memory devices.

Figure 2:
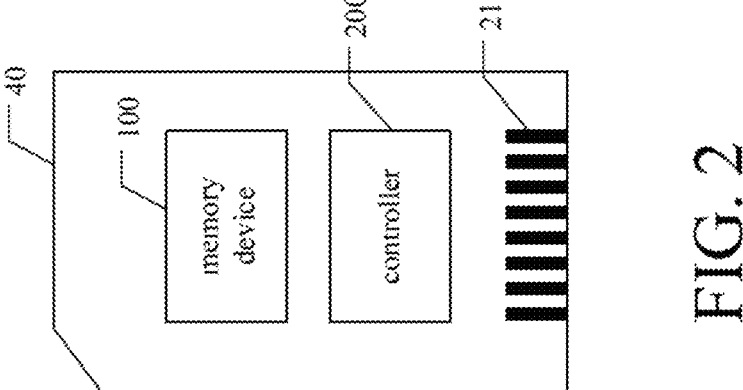
FIG. 2 is a schematic structural diagram of a memory card involved in the present application.

As an example, FIG. 2 is a schematic structural diagram of a memory card involved in the present application. as shown in FIG. 2, the controller 200 and a single memory device 100 may be integrated into a memory card 40. The memory card 40 may include Personal Computer Memory Card International Association (PCMCIA, PC) card, Compact Flash (CF) card, Smart Media (SM) card, memory stick, Multi-Media Card (MMC), RS-MMC, micro-MMC, Secure Digital (SD) card, Universal Flash Storage (UFS), etc. As shown in FIG. 2, the memory card 40 may further include a connector 210 for coupling the memory card 40 with a host.

Figure 3:
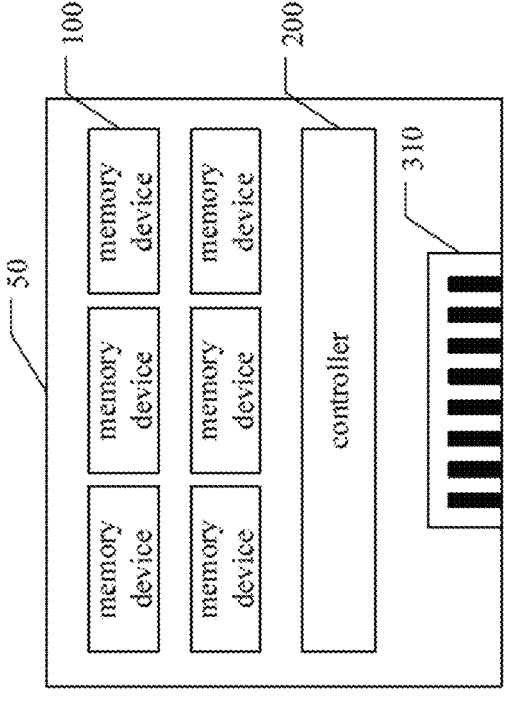
FIG. 3 is a schematic structural diagram of a solid-state drive involved in the present application.

As another example, FIG. 3 is a schematic structural diagram of a solid-state drive involved in the present application. As shown in FIG. 3, the controller 200 and multiple memories 100 may be integrated into a Solid State Disk (SSD) 50. The solid state drive 50 may also include a connector 310 that couples the solid state drive 50 with a host. Wherein the storage capacity and/or operating speed of the solid state drive 50 is greater than the storage capacity and/or operating speed of the memory card 40.

In addition, the memory device 100 in FIG. 1 to FIG. 3 may be any memory device involved in examples of the present application. For example, it could be 3D NAND (NAND gate) memory device. The structure of the memory device 100 is explained and described below.

Figure 4:
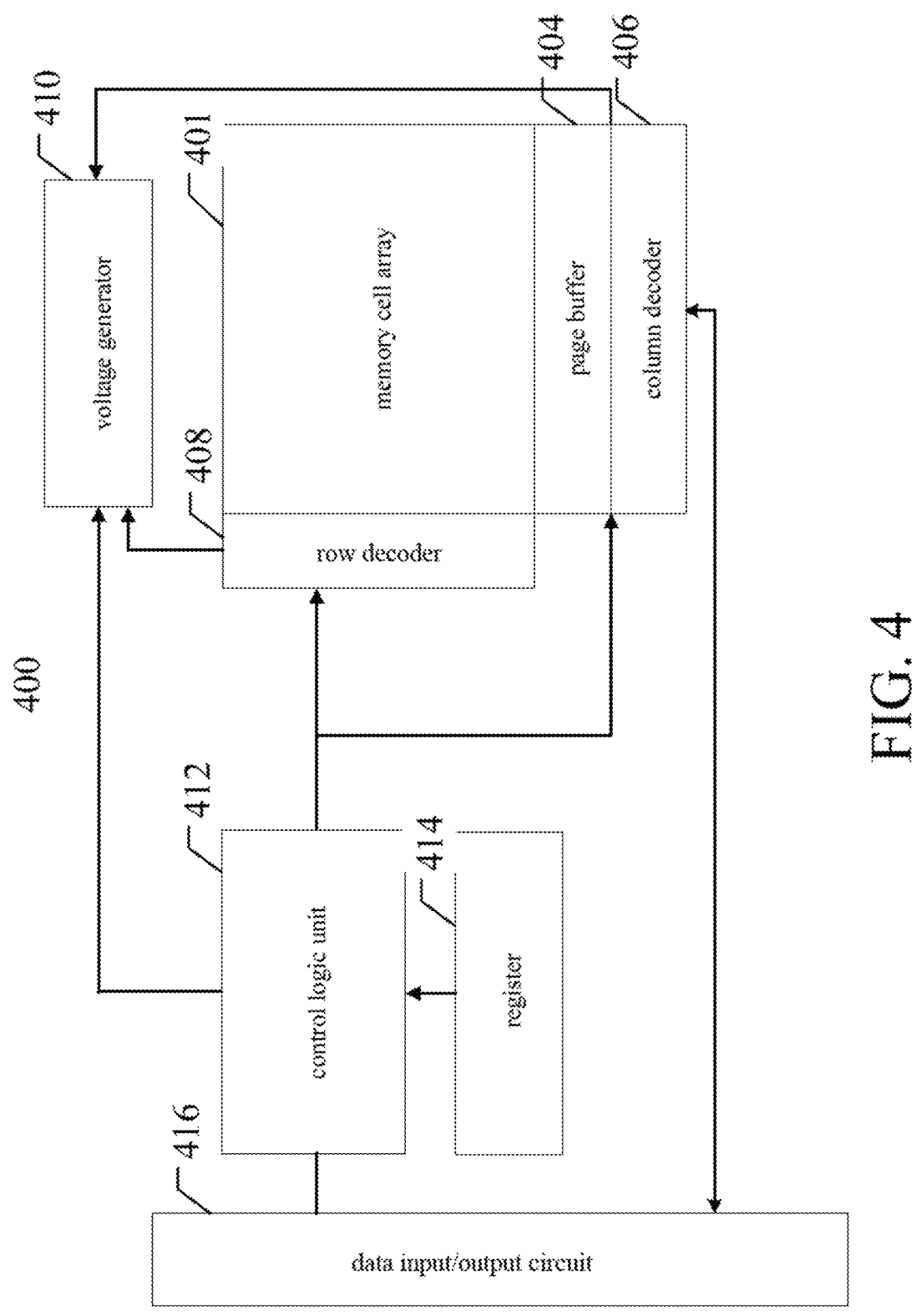
FIG. 4 is a block diagram of a memory device illustrated in an illustrated example of the present application.

FIG. 4 is a block diagram of a memory device illustrated in an illustrated example of the present application. Referring to FIG. 4, the memory device 400 may include a memory cell array 401, a page buffer 404, a column decoder 406, a row decoder 408, a voltage generator 410, a control logic unit 412, a register 414, and a data input/output circuit 416. It should be understood that in some examples, additional peripheral circuits not shown in FIG. 4 may also be included.

The page buffer 404 may be configured to read data from and program (write) data to the memory cell array 401 according to control signals from the control logic unit 412. In one example, the page buffer 404 may store data (written data) to be programmed into a selected page of the memory cell array 401. In another example, the page buffer 404 may output the read data in a program verify operation to ensure that the data has been correctly programmed into corresponding memory cells coupled to selected word lines of memory cell array 401. The column decoder 406 may operate in response to the control signal provided by the control logic unit to select one or more NAND memory strings in the memory cell array 401. The row decoder may operate in response to the control signal provided by the control logic unit and select/deselect a selected row of the memory cell array 401. The row decoder may also be configured to supply the voltage generated from the voltage generator 410 to the selected word lines and unselected word lines of the memory cell array 401. As described in detail below, the row decoder/word line driver 408 is configured to perform erase operation on memory cells coupled to one or more selected word lines in memory cell array 401. The voltage generator 410 may use an external power supply voltage or an internal power supply voltage to generate various voltages required by the memory device, e.g., program voltage, read voltage, pass voltage, verify voltage, bit line voltage, etc., and combinations thereof.

The control logic unit 412 may be coupled to voltage generator 410, page buffer 404, column decoder 406, row decoder 408 and data input/output circuit 416, etc., and configured to control operation of various peripheral circuits. The control logic unit may generate operating signals in response to a command or a control signal from the memory controller. Register 414 may be coupled to the control logic unit 412 and include state register, command register and address register for storing state information, command operation code (OP code) and command address for controlling operations of each of the peripheral circuits. The data input/output circuit 416 may be coupled to the control logic unit 412 and act as a control buffer to buffer and relay control commands received from a host (not shown) to control logic unit 412 and to buffer and relay state information received from the control logic unit 412 to the host. The data input/output circuit 416 may also be coupled to a column decoder, and act as a data input/output interface and data buffer to buffer and relay data to/from memory cell array 401.

Figure 5:
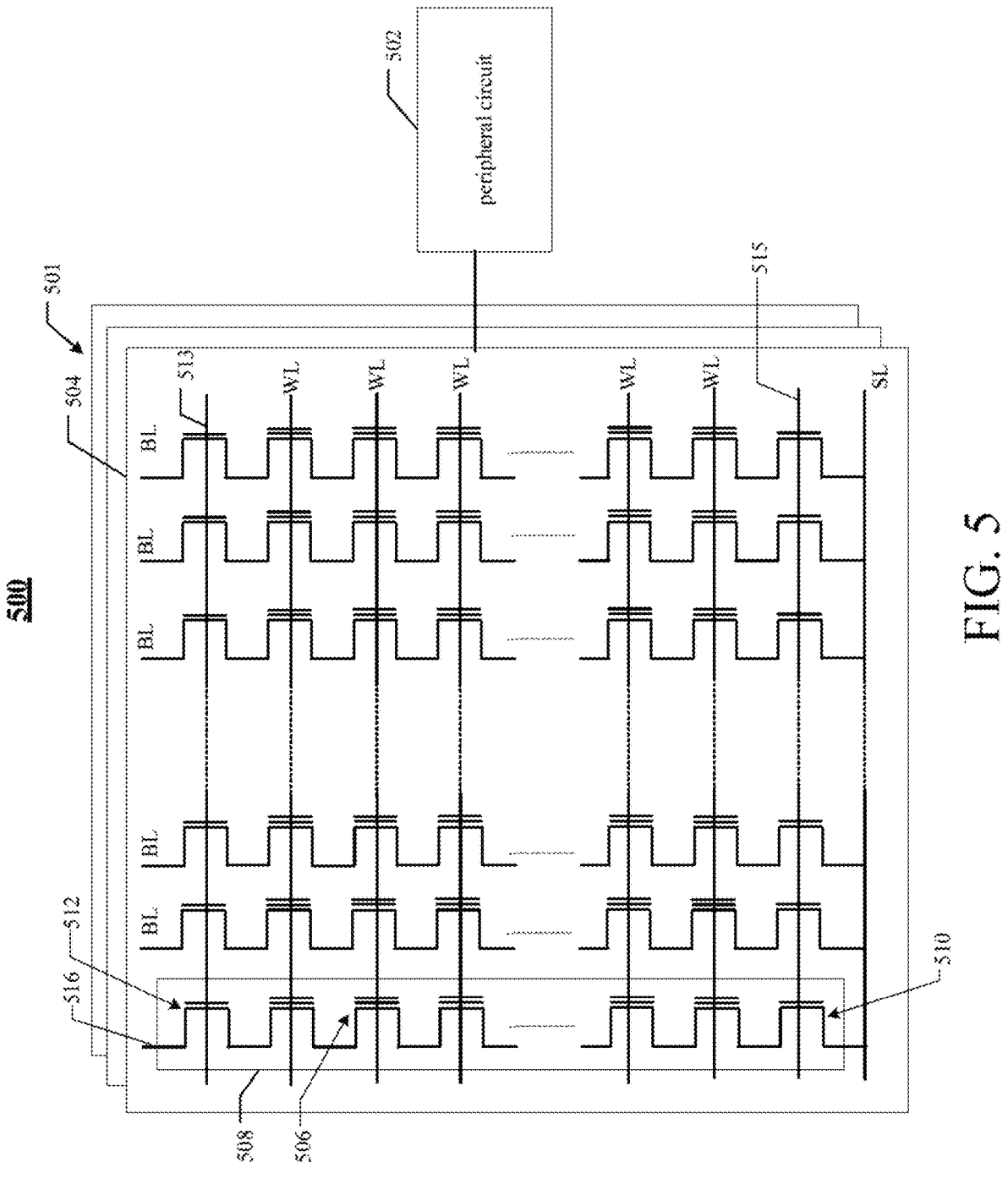
FIG. 5 is a schematic circuit diagram of a memory device shown in an illustrated example of the present application.

FIG. 5 is a schematic circuit diagram of a memory device shown in an illustrated example of the present application. As shown in FIG. 5, memory device 500 may include a memory cell array device 501 and peripheral circuitry 502 coupled to the memory cell array device 501. The memory cell array device 501 may be a NAND flash memory cell array in which memory cells 506 are provided in an array of NAND memory strings 508, each NAND memory string 508 extending vertically over a substrate (not shown). In some implementations, each NAND memory string 508 includes a plurality of memory cells 506 coupled in series and stacked vertically. Each memory cell 506 may be a "floating gate" type memory cell including a floating gate transistor, or a "charge trap" type memory cell including a charge trap transistor. In some implementations, each memory cell 506 is a Single-Level Cell (SLC) that has two possible memory states and may thus store one bit of data. For example, a first memory state of "0" may correspond to a first voltage range, and a second memory state of "1" may correspond to a second voltage range. In some implementations, each memory cell 506 is a multi-level cell capable of storing more than a single bit of data in more than two memory states. For example, two bits may be stored in each cell (i.e., Multi-Level Cell, MLC), three bits may be stored in each cell (i.e., Triple-Level Cell, TLC), or four bits may be stored in each cell (i.e., Quad-Level Cell, QLC).

As shown in FIG. 5, each NAND memory string 508 may include at least one source select transistor 510 at its source terminal and at least one drain select transistor 512 at its drain terminal. The source select transistor 510 and the drain select transistor 512 may be configured to activate a selected NAND memory string 508 during read operation and program operation. In some implementations, the sources of NAND memory strings 508 in the block 504 are coupled through a same source line (SL). According to some implementations, the drain select transistor 512 of each NAND memory string 508 is coupled to a corresponding bit line 516. In some implementations, each NAND memory string 508 is configured to be selected or deselected through at least one of applying a select voltage or deselect voltage (e.g., 0V) to the corresponding drain select transistor 512 via one or more drain select lines 513, or applying a select voltage or deselect voltage (e.g., 0V) to the corresponding source select transistor 510 via one or more source select lines 515.

As shown in FIG. 5, a memory cell array may include multiple blocks. In some implementations, each block 504 is the basic data unit for an erase operation, i.e., all memory cells 506 on a same block 504 are erased simultaneously.

Figure 6:
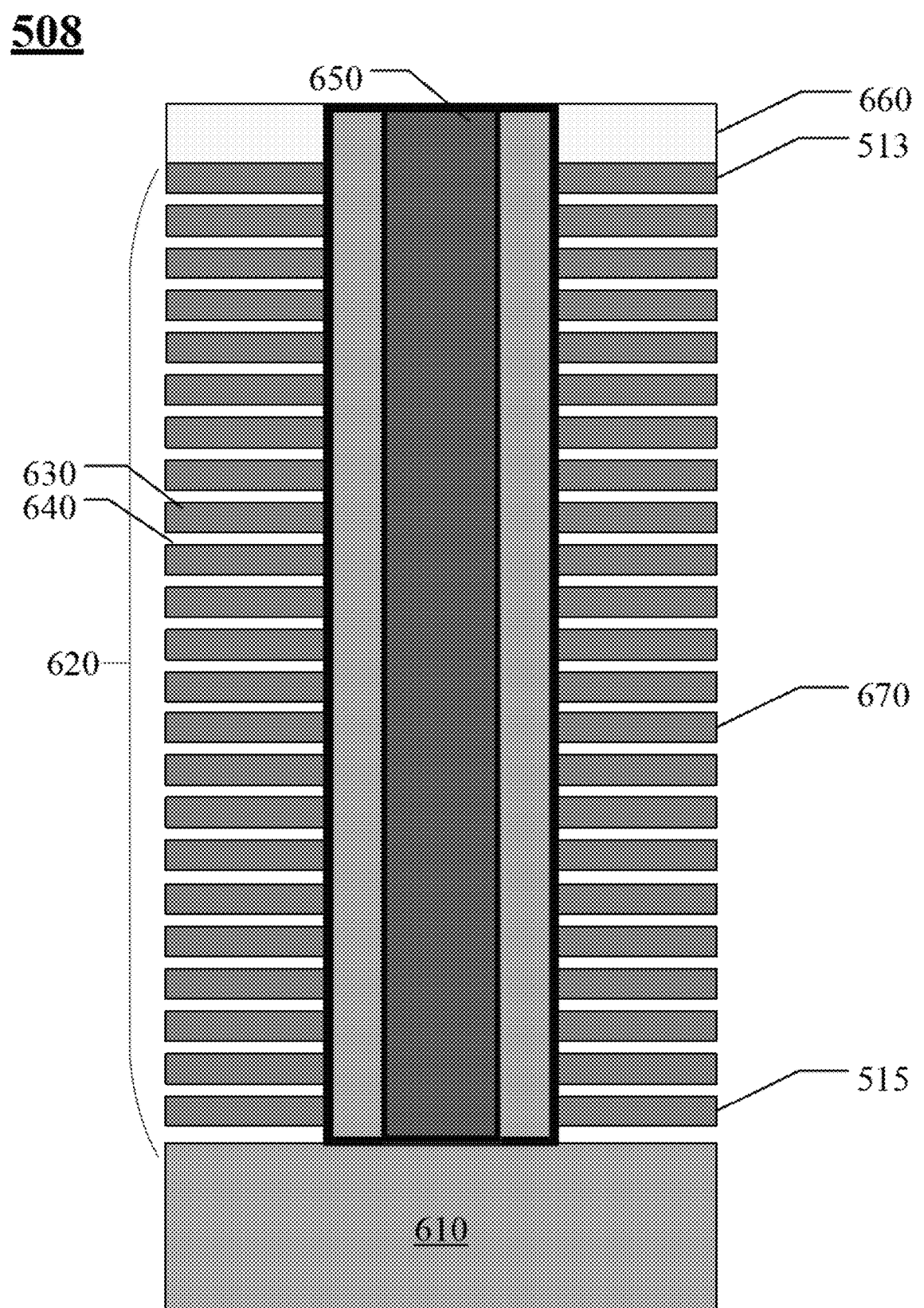
FIG. 6 is a sectional side view of a memory string illustrated in an illustrated example of the present application.

FIG. 6 is a sectional side view of a memory string illustrated in an illustrated example of the present application. Referring to FIG. 6, the memory string 508 may extend vertically through the memory cell stack layer 620 over the doped semiconductor layer 610. The doped semiconductor layer 610 is coupled to the source line. In some examples, the doped semiconductor layer 610 is an N-type doped semiconductor layer, the doped semiconductor layer 610 in this case may be used as a substrate, i.e., an N-type substrate. In some other examples, the doped semiconductor layer 610 is a P-type doped semiconductor layer, the doped semiconductor layer 610 in this case is an P well in the substrate, and the substrate in this case is an P-type substrate.

The memory cell stack layer 620 includes alternating gate conductive layers 630 and gate-to-gate dielectric layers 640. The number of pairs of gate conductive layers 630 and gate-to-gate dielectric layers 640 in the memory cell stack layer 620 may determine the number of memory cells in the memory array. The gate conductive layer 630 may include conductive materials including but not limited to tungsten (W), cobalt (Co), copper (Cu), aluminum (Al), polysilicon, doped silicon, silicide or any combination thereof. In some possible implementations, each gate conductive layer 630 includes a metal layer, e.g., a tungsten layer. In some implementations, each gate conductive layer 630 includes a doped polysilicon layer. Each gate conductive layer 630 may include a gate surrounding the memory cell 112 and may extend laterally at the top of the memory cell stacked layer 620 as a Drain Select Line (DSL) 513, extend laterally at the bottom of the memory cell stacked layer 620 as a Source Select Line (SSL) 515, or extend laterally between the DSL and the SSL as a Word Line (WL) 670.

As shown in FIG. 6, the memory string 508 also includes a channel structure 650 extending vertically through the memory cell stack layer 620, the channel structure 650 includes a channel hole filled with at least one semiconductor material (e.g., a semiconductor channel) and at least one dielectric material (e.g., a memory film). In some implementations, the semiconductor channel includes silicon (e.g., memory film). In some implementations, the memory film is a composite dielectric layer including a tunnel layer, a trap layer, and a barrier layer. The channel structure 650 may have a cylindrical shape (e.g., a pillar shape). According to some implementations, a semiconductor channel, a trap layer (also referred to as storage layer) and a barrier layer are radially arranged in this order from the center of the pillar toward the outer surface of the pillar. A tunnel layer may include silicon oxide, silicon oxynitride, or any combination thereof. A trap layer may include silicon nitride, silicon oxynitride, or any combination thereof. A barrier layer may include silicon oxide, silicon oxynitride, a high-k (high-k) dielectric, or any combination thereof. In an example, a memory film may include a composite layer of silicon oxide/silicon oxynitride/silicon oxide.

As shown in FIG. 6, a doped semiconductor layer 660 is stacked on top of the memory cell stack layer 620 in the memory string 508, the doped semiconductor layer 660 is also referred to as a bit line contact, the doped semiconductor layer 660 is coupled to the bit line, and the doped semiconductor layer 660 is an N-type doped semiconductor layer.

In the case that the doped semiconductor layer 660 is an N-type doped semiconductor layer, the memory string 508 may be erased in a Gate-Induced Drain Leakage (GIDL) erase manner through the bit line coupled to the doped semiconductor layer 660 and the DSL coupled to the TSG in the memory string 508. For example, an erase voltage is applied to the bit line coupled to the doped semiconductor layer 660 so that the erase voltage acts on the doped semiconductor layer 660, and a voltage less than the erase voltage is applied to the DSL coupled to the TSG in the memory string 508, so that a voltage difference is formed between the gate of the TSG and the doped semiconductor layer 660, this voltage difference causes band tunneling to occur between the gate of the TSG and the doped semiconductor layer 660, and generates GIDL, the holes in the GIDL move from this location to the channel of the memory string 508, thereby injecting holes from this location into the channel of the memory string 508, causing the potential of the channel to increase. A voltage less than the erase voltage (referred to as a low voltage, such as 0V) is applied to the word line coupled to each memory cell in the memory string 508 to apply a low voltage to the gate of the memory cell, and as the channel potential of the memory cell increases, the voltage difference between the gate of the memory cell and the channel of the memory cell increases, and when the voltage difference is greater than the tunneling voltage of the memory cell, this voltage difference causes a tunneling effect between the channel of the memory cell and the gate of the memory cell, and then the holes in the channel of the memory cell tunnel to the storage layer of the memory cell to eliminate the electrons in the storage layer, thereby implementing erase for the memory cell.

In some examples, in the case that the doped semiconductor layer 610 is an N-type doped semiconductor layer, the substring block may be erased in a GIDL erase manner through the source line coupled to the doped semiconductor layer 610 and the SSL coupled to the BSG in the memory string 508. For example, an erase voltage is applied to the source line, and a voltage less than the erase voltage (referred to as a low voltage) is applied to the SSL coupled to the BSG, causing GIDL to be generated between the gate of the BSG and the doped semiconductor layer 610, the holes in the GIDL move toward the channel, thereby injecting holes from this location into the channel of the memory string 508, causing the potential of the channel to increase, a low voltage is applied to the word line coupled to each memory cell in the memory string 508, and as the channel potential of the memory cell increases, when the voltage difference between the gate of the memory cell and the channel of the memory cell is greater than the tunneling voltage of the memory cell, the holes in the channel of the memory cell tunnel to the storage layer of the memory cell to eliminate the electrons in the storage layer, thereby implementing erase for the memory cell.

Based on this, when the doped semiconductor layer 610 and the doped semiconductor layer 610 are both N-type doped semiconductor layers, the peripheral circuit may perform an erase operation on the memory string 508 in the GIDL erase mode at either end of the memory string 508 (i.e., the single-end GIDL erase mode), or may perform an erase operation on the memory string 508 in the GIDL erase mode respectively at both ends of the memory string 508 (i.e., the double-end GIDL erase mode).

In some other examples, in the case that the doped semiconductor layer 610 is a P-type doped semiconductor layer, the memory string 508 is erased based on the erase manner for the P-type doped semiconductor layer. For example, an erase voltage is applied to the source line to act on the P-type doped semiconductor layer, and the erase voltage causes holes to be generated in the P-type doped semiconductor layer; a low voltage is applied to the BSG of the memory string 508 and the word lines coupled to each memory cell, so that the low voltage acts on the gate of the BSG and the gate of each memory cell, since the low voltage is less than the erase voltage, holes move from the P-type doped semiconductor layer to the channel of the memory string 508, thus holes are injected from the P-type doped semiconductor layer into the channel, causing the potential of the channel to increase, as the channel potential of the memory cell increases, when the voltage difference between the gate of the memory cell and the channel of the memory cell is greater than the tunneling voltage of the memory cell, the holes in the channel of the memory cell tunnel to the storage layer of the memory cell to eliminate the electrons in the storage layer, thereby implementing erase for the memory cell.

Based on this, in the case that the doped semiconductor layer 660 is an N-type doped semiconductor layer and the doped semiconductor layer 610 is a P-type doped semiconductor layer, double-end erase may be performed on the memory string 508, e.g., single-end GIDL erase is performed on one end of the memory string 508 close to the N-type doped semiconductor layer, and erase based on the P-type doped semiconductor layer is performed on the other end of the memory string 508. Alternatively, single-end erase is performed on the memory string 508, e.g., single-end GIDL erase is performed on one end of the memory string 508 close to the P-type doped semiconductor layer, but erase based on the P-type doped semiconductor layer is not performed on the other end of the memory string 508; or single-end GIDL erase is not performed on one end of the memory string 508 close to the P-type doped semiconductor layer, but erase based on the P-type doped semiconductor layer is performed on the other end of the memory string 508.

For technical details not disclosed in the above memory-related hardware examples, please refer to the description of the computer system examples and method examples of the present application for understanding.

Figure 7:
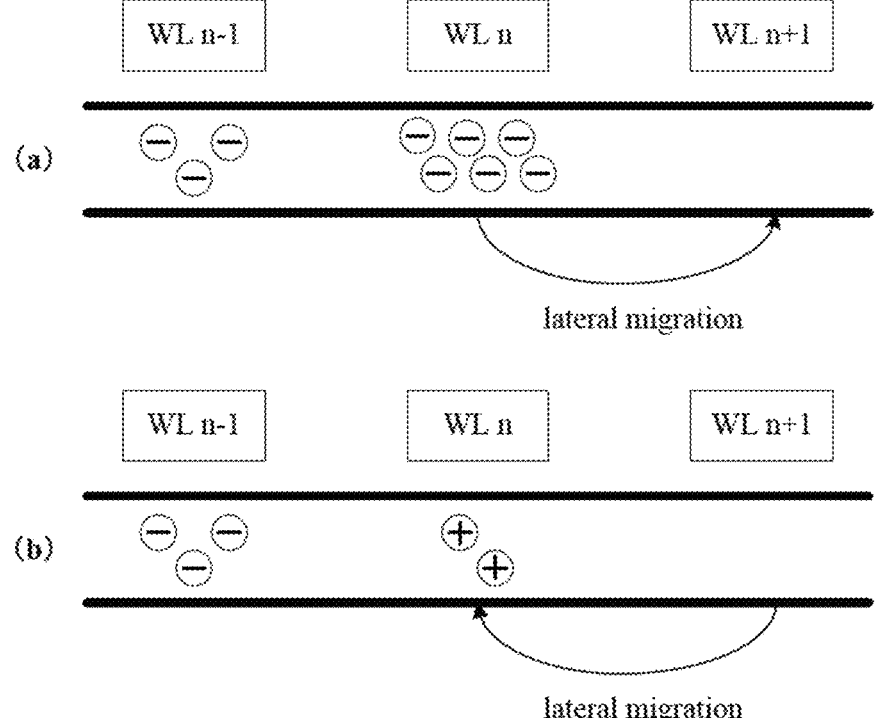
FIG. 7 is a schematic diagram of electron lateral migration between memory cells.

Please refer to FIG. 7, which illustrates a schematic diagram of electron lateral migration between memory cells. As shown in FIG. 7, the same memory string contains at least three memory cells, which are a memory cell corresponding to word line n−1 (WL n−1), a memory cell corresponding to word line n (WL n), and a memory cell corresponding to word line n+1 (WL n+1); assume that the memory cells corresponding to WL n−1 and WL n are the memory cells which have been written with data (WL n is the edge word line at this point), and the memory cell corresponding to WL n+1 is the memory cell which has not been written with data; as shown in part (a) of FIG. 7, in the case that the program state of the memory cell corresponding to WL n is in a high state and the memory cell corresponding to WL n+1 has not been written with data, electrons in the memory cell corresponding to WL n may migrate laterally to the memory cell corresponding to WL n+1; as shown in part (b) of FIG. 7, in the case that the program state of the memory cell corresponding to WL n is in a low state and the memory cell corresponding to WL n+1 has not been written with data, electrons in the memory cell corresponding to WL n+1 may migrate laterally to the memory cell corresponding to WL n.

In a possible implementation, random data may be written in a memory cell that has not been written with data to suppress the difference between the program states of the memory cell corresponding to word line n (WL n) and the memory cell corresponding to word line n+1 (WL n+1), and since the program state of the memory cell that has been written with random data is unpredictable, it may not be guaranteed that a small difference exists between the program states of the memory cell corresponding to word line n (WL n) and the memory cell corresponding to word line n+1 (WL n+1), and the opposite effect may even be brought.

Figure 8:
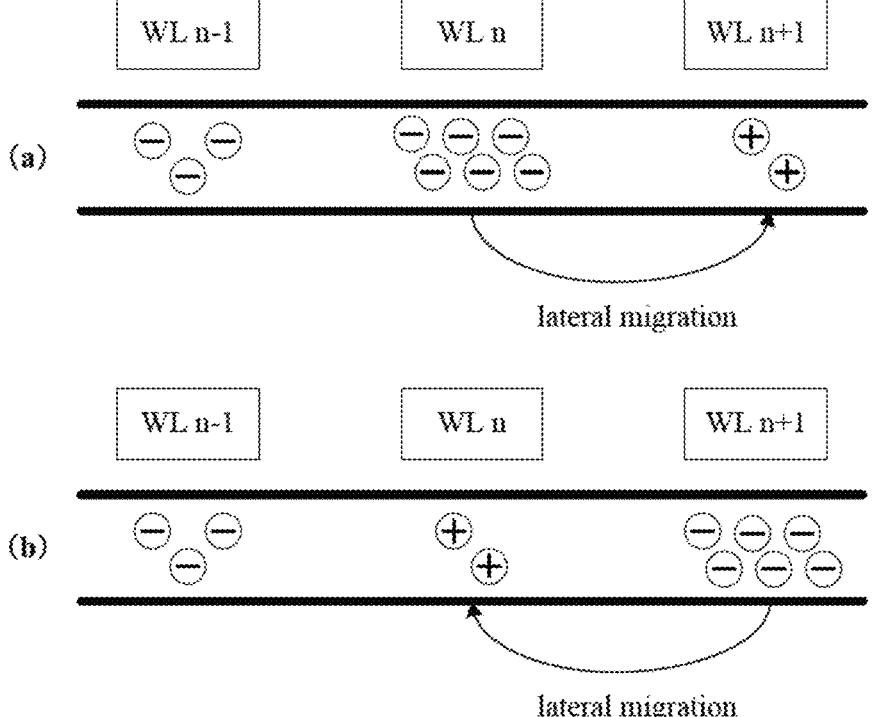
FIG. 8 is another schematic diagram of electron lateral migration between memory cells.

For example, in case that random data is written to a memory cell that has not been written with data, please refer to FIG. 8, which illustrates a schematic diagram of electron lateral migration between memory cells. As shown in part (a) of FIG. 8, in the case that the program state of the memory cell corresponding to WL n is in a high state and the memory cell corresponding to WL n+1 is in a low state after being written with random data, the memory cell corresponding to WL n+1 may result in a strong coupling on the adjacent memory cell corresponding to WL n, that is to say, compared to the situation shown in part (a) of FIG. 7, at this point, a more obvious lateral migration of the electrons in the memory cell corresponding to WL n to the memory cell corresponding to WL n+1 may occur; as shown in part (a) of FIG. 8, in the case that the program state of the memory cell corresponding to WL n is in a low state and the memory cell corresponding to WL n+1 is in a high state after being written with random data, compared to the situation shown in part (b) of FIG. 8, at this point, a more obvious lateral migration of the electrons in the memory cell corresponding to WL n+1 to the memory cell corresponding to WL n may occur.

Regarding the problems described above, the implementation shown in the subsequent examples of the present application provides a new method for operating the memory system, which can make the memory cells in the edge word line being in the same program state as the memory cells in the next word line, therefore, the lateral migration phenomenon of electrons between the memory cells in the edge word lines and the corresponding memory cells is suppressed, and the data retention performance of the edge word lines is improved.

Figure 9:
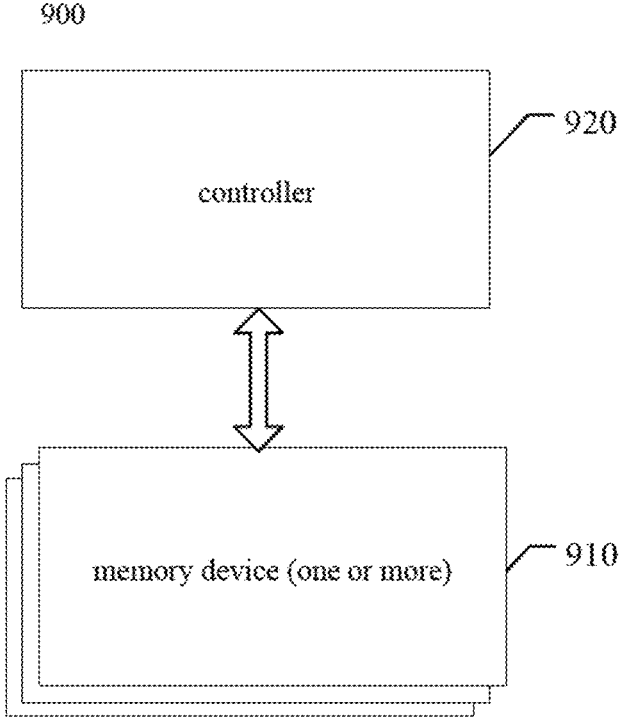
FIG. 9 is a structural block diagram of a memory system provided by an illustrated example of the present application.

FIG. 9 is a structural block diagram of a memory system provided by an illustrated example of the present application, as shown in FIG. 9, the memory system 900 includes: one or more memories 910, and, a controller 920 coupled to the memory device 910 and configured to control the memory device 910.

The memory system 900 may be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or all or part of any other suitable electronic devices having memory device therein.

Optionally, the memory system 900 may include a host and a memory subsystem having one or more memories 910 and a controller 920. The host may be a processor of an electronic device (e.g., a Central Processing Unit (CPU)) or a System on Chip (SoC) (e.g., an Application Process (AP)). The host may be configured to send data to the memory device 910. Alternatively, the host may be configured to receive data from the memory device 910.

According to some implementations, the controller 920 is also coupled to the host. The controller 920 may manage data stored in the memory device 910 and communicate with the host.

In some implementations, the controller 920 is designed to operate in low duty cycle environments, e.g., Secure Digital (SD) card, Compact Flash (CF) card, Universal Serial Bus (USB) flash drive, or other media for use in electronic devices such as personal computer, digital camera, mobile phone, etc.

In some implementations, the controller 920 is designed to operate in high duty cycle environments Solid State Drive (SSD) or Embedded Multi Media Card (eMMC), where SSD or eMMC is used as data storage for mobile devices such as smartphone, tablet computer, laptop computer, and enterprise storage array.

The controller 920 may be configured to control operations of the memory device 910, e.g., operations of read, erase, and program. The controller 920 may be further configured to manage various functions related to data stored or to be stored in memory device 910, including but not limited to bad block management, garbage collection, logical-to-physical address translation, wear leveling, etc. In some implementations, the controller 920 is also configured to process error correction code (ECC) related to data read from or written into the memory device 910.

The controller 920 may also perform any other suitable functions, e.g., formatting memory device 910. The controller 920 may also communicate with external devices according to a particular communication protocol.

The controller 920 and one or more memories 910 may be integrated into various types of storage devices, e.g., included in the same package (e.g., Universal Flash Storage (UFS) package or eMMC package). That is, memory system 900 may be implemented and packaged into different types of end electronic products.

Schematically, the controller 920 and a single memory device 910 may be integrated into a memory card. A memory card may include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. A memory card may further include a memory card connector coupling the memory card with a host.

Schematically, the controller 920 and the multiple memories 910 may be integrated into the solid state drive (SSD). In some implementations, at least one of the storage capacity or operating speed of the solid state drive is greater than at least one of the storage capacity or operating speed of the memory card.

The memory device 910 described above may be implemented as the memory device 100 in any of the examples shown in FIGS. 1 to 3; the controller 920 described above may be implemented as the controller 200 in any of the examples shown in FIGS. 1 to 3.

In an example of the present application, the controller 920 is configured to send a read command to the memory device 910.

For example, the micro control unit in the control 920 may generate a read command and send the read command to the memory device 910 through the memory interface in the control 920. The memory interface described above may be an interface between the controller 920 and the memory device 910.

The memory 910 is configured to read data stored in a first memory cell in the memory 910 according to the read command; the first memory cell and the second memory cell are located in the same memory string, and the word lines coupled to the first memory cell and the second memory cell respectively are adjacent; the second memory cell is a memory cell that has not yet been written with data.

For example, the peripheral circuit in the memory device 910 may read the data of the first memory cell in the memory cell array of the memory device 910 according to the read command described above, and return the read data to the controller 920.

The controller 920 is also configured to send a write command to the memory device 910.

For example, after the controller 920 receives the data returned from the memory device 910, the micro control unit in the control 920 may generate a write command, and the write command may be a command to write the data described above into the second memory cell. Then, the micro control unit sends the write command to the memory device 910 through the memory interface in the control 920.

The memory device 910 is further configured to write data read from the first memory cell to the second memory cell according to the write command.

For example, the peripheral circuit in the memory device 910 described above may write data into the second memory cell in the memory cell array of the memory device 910 according to the write command described above, and return a write completion response to the controller 920.

Figure 10:
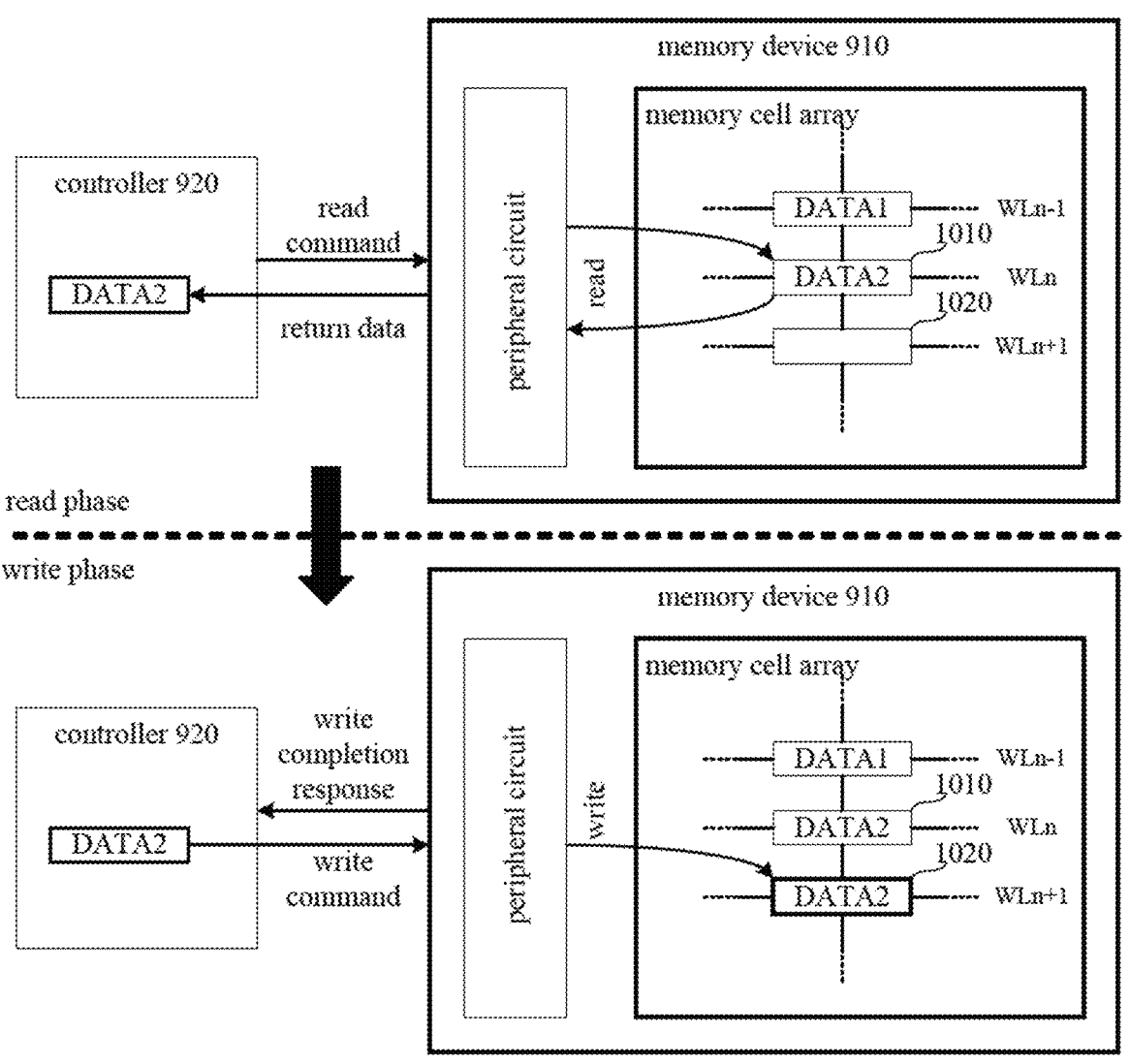
FIG. 10 is a schematic structural diagram of a memory system involved in an example of the present application.

Please refer to FIG. 10, which illustrates a schematic structural diagram of a memory system involved in an example of the present application. As shown in FIG. 10, in the memory cell array of memory device 910, a same memory string contains multiple memory cells, wherein the memory cell 1010 corresponding to WL n has been written with data (DATA2), and the memory cell 1020 corresponding to WL n+1 has not yet been written with data. At this point, WL n may be considered as an edge word line, in order to improve the data retention capability of the memory cell 1010 in WL n, the controller 920 may perform data filling processing on the memory cell 1020 in WL n+1 by way of write-after-read.

As shown in FIG. 10, during the read phase, the controller 920 generates a read command and sends it to the memory device 910, the peripheral circuit in the memory device 910 reads the data (DATA2) in the memory cell 1010 according to the read command, and then returns the read data to the controller 920 for buffering.

In the write phase, the controller 920 generates a write command to write the buffered data (DATA2) to the memory cell 1020 in WL n+1, and sends the write command to the memory device 910; the peripheral circuit in the memory device 910 writes the data (DATA2) into the memory cell 1020 according to the write command, and after the write is completed, returns a response to the write completion to the controller 920.

In the memory system illustrated in the examples of the present application described above, the controller copies the data in the memory cell 1010 in the edge word line to the adjacent memory cell 1020 in the same memory string that has not been written with data by way of write-after-read, so that the memory cell 1010 and the memory cell 1020 are in the same program state, thereby suppressing the phenomenon of electron lateral migration between the memory cell 1010 and the memory cell 1020 and improving the data retention performance of the memory cell 1010.

Figure 11:
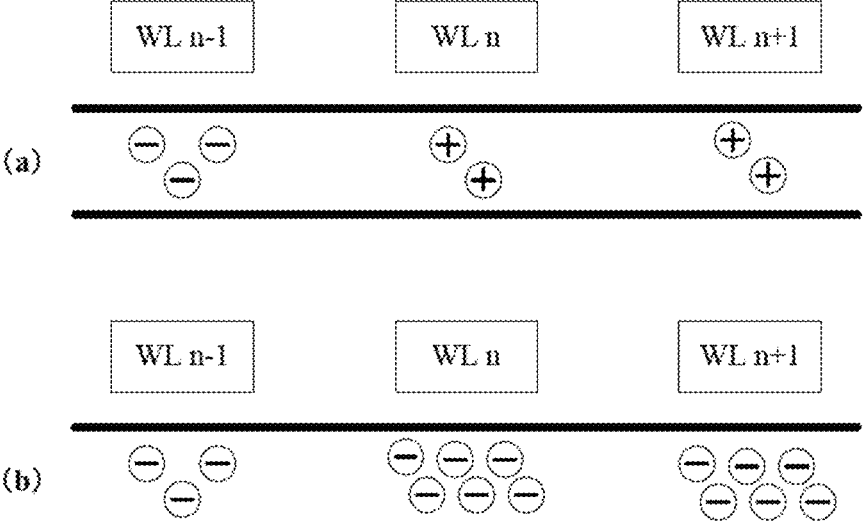
FIG. 11 is a schematic diagram of a program state of a memory cell involved in an example of the present application.

Please refer to FIG. 11, which illustrates a schematic diagram of a program state of a memory cell involved in an example of the present application. Wherein the corresponding word line n (WL n) corresponds to the memory cell 1010, and the corresponding word line n+1 (WL n+1) corresponds to the memory cell 1020; after the write-after-read operation shown in FIG. 10, the same data is written in the memory cells corresponding to WL n−1 and WL n; as shown in part (a) of FIG. 11, assuming that the program state of the memory cell corresponding to WL n is in a low state, after performing the write-after-read operation described above, the program state of the memory cell corresponding to WL n+1 is also in a low state, and compared with the situation in part (a) of FIG. 7 and part (a) of FIG. 8, the lateral migration of electrons between the two memory cells is suppressed to the greatest extent; as shown in part (b) of FIG. 11, assuming that the program state of the memory cell corresponding to WL n is in a high state, after performing the write-after-read operation described above, the program state of the memory cell corresponding to WL n+1 is also in a high state, and compared with the situation in part (b) of FIG. 7 and part (b) of FIG. 8, the lateral migration of electrons between the two memory cells is suppressed to the greatest extent.

In summary, through the implementation illustrated in the above examples of the present application, for an open memory string in the memory device, if the first memory cell in the memory string has been written with data, and the second memory cell adjacent to the first memory cell in the memory string has not been written with data, at this point, the word line at which the first memory cell is located is the edge word line, and in the example of the present application, the data in the first memory cell may be read out by way of write-after-read, and then written into the second memory cell, thus, the same data may be stored in the first memory cell and the second memory cell, that is, the first memory cell and the second memory cell may be in the same program state, therefore, the phenomenon of electron lateral migration between the first memory cell and the memory cell may be suppressed, thereby improving the data retention performance of the first memory cell, that is, improving the data retention performance of the edge word line.

Based on the implementation illustrated in the example described above, in an example, the controller 920 is configured to: in the case that the time duration in which the data has been written in the first memory cell reaches a time duration threshold, send the read command to the memory device 910.

After data is written into the first memory cell in the memory block, data may also be written into the second memory cell adjacent to the first memory cell in a short period of time, so that there is no need for the first memory cell to be enhanced with data retention performance, if after data is written into the first memory cell, the data in the first memory cell is immediately read and written into the second memory cell, and within a short period of time, new data is further written into the data block, in this case, unnecessary occupation of the second memory cell will occur, therefore resulting in a decrease in storage resource utilization; furthermore, the phenomenon of electron lateral migration between memory cells will not affect the accuracy of the data in the memory cells of the edge word lines in a short period of time, instead, it may bring a significant impact on the accuracy of the data after a period of time.

In this regard, in the example of the present application, when the controller 920 determines that the first memory cell is a memory cell in the edge word line and no data is written in the second memory cell, the controller 920 may first determine whether the time duration in which the data has been written in the first memory cell reaches the time duration threshold, that is to say, whether the time duration in which the data in the first memory cell being stored in the first memory cell is long enough, wherein, the controller 920 may store time information (e.g., write timestamp) when the data in each memory cell is written to the memory device 910, the controller 920 may check the time information when the data in the first memory cell is written into the memory device 910, and determine the time duration between the time indicated by the time information and the current time as the time duration in which the data has been written in the first memory cell.

If the time duration in which the data has been written in the first memory cell reaches the time duration threshold, it means that no new data has been written to the memory block for a long time, which indicates that the memory block is currently in a state where no data is written, and the memory cells of the edge word lines in the memory block need to be enhanced with the data retention performance, at this point, the controller 920 may send a read command to the memory device 910; on the contrary, if the time duration in which the data has been written in the first memory cell does not reach the time duration threshold, it means that data has been written to the memory block in a short period of time, and new data may continue to be written in a short period of time, moreover, the phenomenon of electron lateral migration between memory cells has not yet affected the data in the first memory cell, at this point, the controller 920 may not send a read command to the memory device 910; the implementation described above may ensure the utilization of storage resources while ensuring the data retention performance of the first memory cell.

Based on the implementation illustrated in the example described above, in an example, the controller 920 is further configured to obtain the physical address of the first memory cell and the physical address of the second memory cell; the controller 920 is configured to send the read command to the memory device 910 according to the physical address of the first memory cell, and to send the write command to the memory device 910 according to the physical address of the second memory cell.

In an example of the present application, the controller 920 may generate the read command and write command described above according to the physical addresses of the first memory cell and the second memory cell, e.g., the controller 920 may generate a read command containing the physical address of the first memory cell described above, and a write command containing the physical address of the second memory cell described above.

For example, the controller 920 may store the physical addresses of each memory cell in the memory device, and the controller 920 may obtain the physical addresses of the first memory cell and the second memory cell by checking the stored physical address of each memory cell.

For example, the controller 920 may obtain the physical address of the first memory cell that has been written with data described above by checking a Logical to Physical (L2P) table, and then determine the physical address of the second memory cell that is adjacent to the first memory cell in the same memory string and has not yet been written with data through the physical address of the first memory cell.

Based on the implementation illustrated in the example described above, in an example, the controller 920 is further configured to: before sending the read command to the memory device 910, in the case that the memory block is open and the data in the third memory cell in the memory block is valid data, determine the first memory cell in the memory block and the second memory cell corresponding to the first memory cell according to the location of the third memory cell in the memory block; wherein, the third memory cell is the last memory cell among the memory cells in the memory block that have been written with data.

In the implementation illustrated in the example described above of the present application, the above valid data refers to the data written by the controller 920 in each memory cell of the memory device according to the write request of the host; accordingly, according to the implementation illustrated in the example described above of the present application, the data written into the empty memory cell by way of write-after-read may be referred to as invalid filled data; that is to say, the above valid data is the data that the host actively requests the controller to write into the memory device, subsequently, the host may also request the controller to read the valid data from the memory device; on the contrary, the above filled data is not the data requested to be written by the host, but the data being automatically filled in the empty memory cell by the controller, normally, the host will not subsequently request the controller to read filled data from the memory device.

Wherein since the filled data is not the data required by the host, it will not affect the traffic in the host, therefore, the memory cell written with the filled data has a low performance requirement for data retention, and if the memory cell written with the filled data is used as the first memory cell, unnecessary filling operations will be introduced, which will affect the power consumption of the memory device in an aspect, and occupy too many storage resources in another aspect.

Additionally, in some examples, data is written into respective memory cells in a memory block in adjacent order, e.g., taking in the memory 910 described above, the data being written in memory cells in each memory block sequentially in the order of string serial numbers from small to large and word line numbers from small to large as an example, when this memory block is being written with data, the controller 920 writes data to respective memory cells of WL0 of the memory block in the order of sequence number of the memory string from small to large; after respective memory cells in WL0 have been written with data, the controller 920 writes data to respective memory cells in WL1 of the memory block in the order of sequence number of the memory string from small to large, and so on.

In this regard, in the implementation shown in the example of the present application described above, for an open memory block (open block), if among the memory cells that have been written with data in this memory block, the data in the last memory cell in the writing order is filled data, it means that the edge word line storing valid data in this memory cell has already been performed the write-after-read operation described above, and there is no need to perform redundant write-after-read processing; on the contrary, if among the memory cells that have been written with data, the data in the last memory cell in the writing order is valid data, it means that the write-after-read operation described above is not performed on the edge word line that stores valid data in this memory cell, and the memory cell in this edge word line requires higher data retention performance; at this point, the last memory cell among the memory cells that have been written with data may be determined as the third memory cell described above, and based on the location of the third memory cell in the memory block, it may be determined which memory cells in this memory block are the first memory cells that need to be enhanced with data retention performance, and which memory cells are the second memory cells into which filled data need to be written. Through the implementation described above, unnecessary write-after-read operations performed for the storage cells in the data block may be avoided, and the power consumption of the memory device and the occupation of storage resources may be reduced while ensuring the data retention performance of the memory cells in an edge word line.

Based on the implementation illustrated in the example described above, in an example, the controller 920 is configured to: in the case that the third memory cell is the last memory cell in the n-th word line of the memory block, determine the memory cells in the n-th word line respectively as the first memory cells; determine the memory cell in the same memory string as the first memory cell in the (n+1)-th word line of the memory block as the second memory cell corresponding to the first memory cell; wherein, $1 \leq n < N$, n is an integer, and M is the number of word lines in the memory block.

For example, in the memory device 910 described above, the serial numbers of respective memory strings in the memory block increase sequentially from 0, and the serial numbers of respective word lines in the memory block also increase sequentially from 0, in the case that the memory cells in the memory block write data sequentially in order of word line serial numbers from small to large, if the serial number of the memory string corresponding to the above-mentioned third memory cell is the maximum value of the string serial number, it may be determined that the third memory cell is the last memory cell in the n-th word line, which means that the edge word line in this memory block is the n-th word line described above, and all memory cells in the n-th word line need to be enhanced with data retention performance, at this time, the controller 920 may determine all memory cells in the n-th word line as first memory cells, and for each first memory cell, the controller 920 determines the memory cell corresponding to the (n+1)-th word line in the memory string at which the first memory cell is located as the second memory cell corresponding to the first memory cell.

Figure 12:
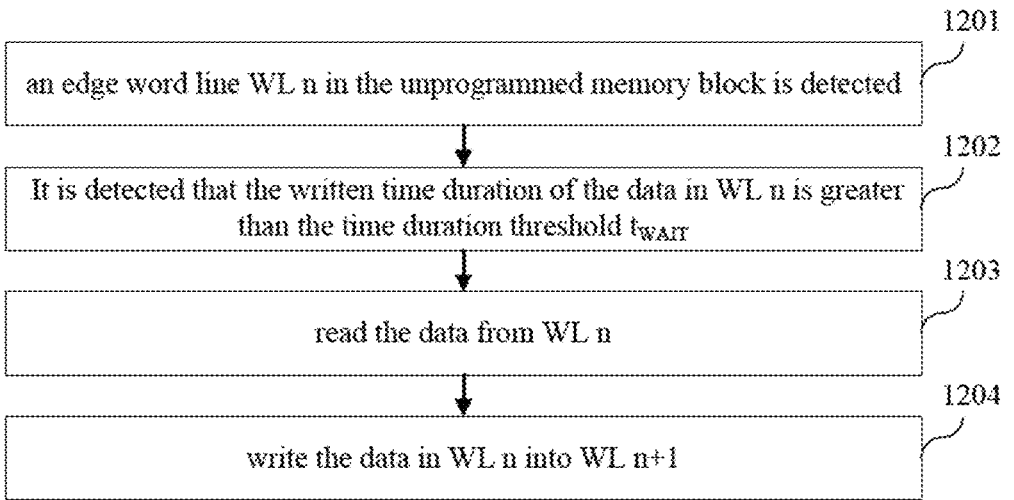
FIG. 12 is a flow chart of a read and write operation involved in an example of the present application.
Figure 13:
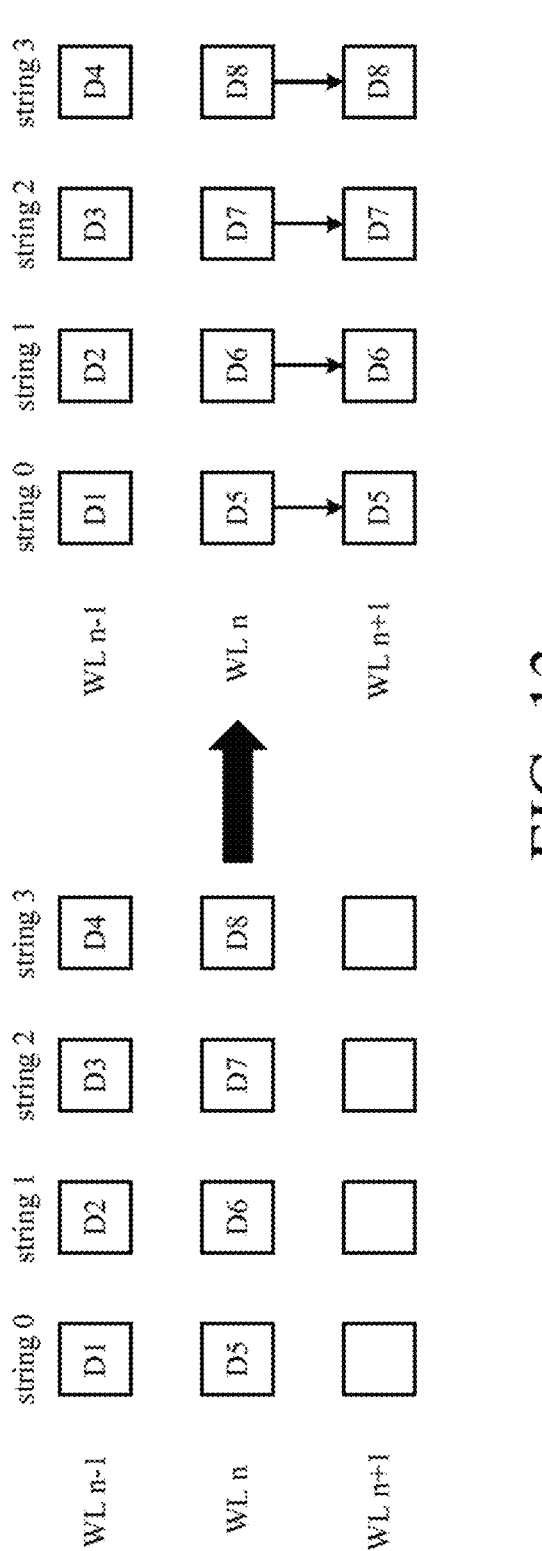
FIG. 13 is an effect diagram of a read and write operation involved in an example of the present application.

For example, please refer to FIGS. 12 and 13, where FIG. 12 illustrates a flow chart of a read and write operation involved in an example of the present application, and FIG. 13 illustrates an effect diagram of a read and write operation involved in an example of the present application.

As shown in FIGS. 12 and 13, the read operation and write operation described above include the following operations:

S1201. An edge word line WL n in the unprogrammed memory block is detected.

As shown in FIG. 13, the memory cells corresponding to all memory strings (string 0 to string 3) in WL n are the first memory cells.

S1202. It is detected that the time duration in which the data has been written in WL n is greater than the time duration threshold $t_{WAIT}$. That is to say, the written time duration of the above data D5~D8 is greater than the time duration threshold.

S1203, read the data from WL n, e.g., read the data D5~D8 in FIG. 13.

S1204, write the data in WL n into WL n+1, that is, in FIG. 13, in WL n+1, data D5~D8 is written sequentially in the order of the memory string numbers from 0 to 3.

As shown in FIG. 13, after performing the above operations S1201 to S1204, the data in the two memory cells belonging to the same memory string in WL n and WL n+1 are the same, that is, the program states of the two are the same.

Based on the implementation illustrated in the example described above, in an example, the controller 920 is configured to: in the case that the third memory cell is not the last memory cell in the n-th word line of the memory block, determine a non-empty memory cell in the n-th word line as the first memory cell, determine the memory cell in the same memory string as the first memory cell in the (n+1)-th word line of the memory block as the second memory cell corresponding to the first memory cell; and determine the memory cell in the n-th word line that has not yet been written with data as the second memory cell, determine the memory cell in the same memory string as the second memory cell in the (n−1)-th word line of the memory block as the first memory cell corresponding to the second memory cell; wherein, 1≤n<N, n is an integer, and M is the number of word lines in the memory block.

For example, in the memory device 910 described above, the serial numbers of respective memory strings in the memory block increase sequentially from 0, and the serial numbers of respective word lines in the memory block also increase sequentially from 0, in the case that the memory cells in the memory block write data sequentially in order of word line serial numbers from small to large, if the serial number of the memory string corresponding to the above-mentioned third memory cell is not the maximum value of the string serial number, it may be determined that the third memory cell is not the last memory cell in the n-th word line, which means that the edge word lines in this memory block are the n-th word line and the (n−1)-th word line described above, and a portion of memory cells in the n-th word line and the (n−1)-th word line need to be enhanced with data retention performance, in some examples, in the n-th word line and the (n−1)-th word line, for a memory cell A, if a memory cell B is in the same memory string with the memory cell A, and is adjacent to the memory cell A which has not been written with data, the memory cell A needs to be enhanced with the data retention performance; at this point, for any memory cell in the n-th word line that has been written with data, the controller 920 may determine it as a first memory cell, and determine the memory cell adjacent to the first memory cell in the (n+1)-th word line as a corresponding second memory cell; furthermore, for any memory cell in the n-th word line that has not been written with data, the controller 920 may determine it as a second memory cell, and set the memory cell adjacent to the second memory cell in the (n−1)-th word line as a corresponding first memory cell.

Figure 15:
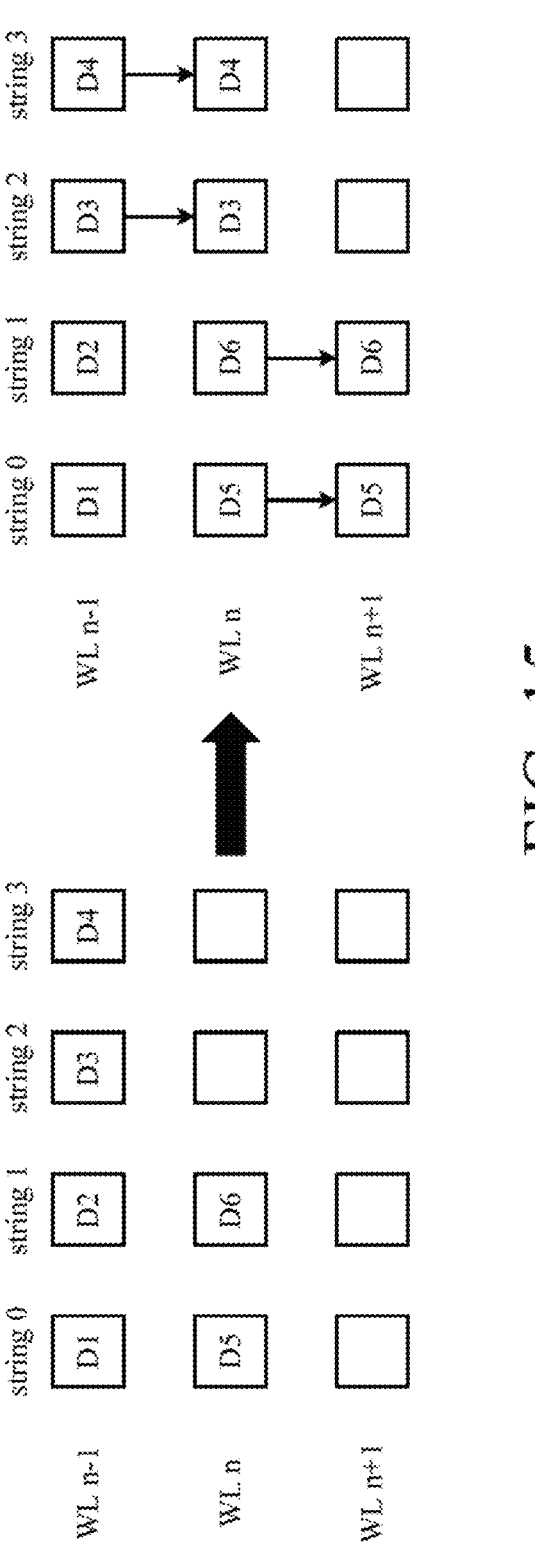
FIG. 15 is an effect diagram of another read and write operation involved in an example of the present application.

For example, please refer to FIGS. 14 and 15, wherein FIG. 14 illustrates a flow chart of another read and write operation involved in an example of the present application, and FIG. 15 illustrates an effect diagram of another read and write operation involved in an example of the present application.

As shown in FIGS. 14 and 15, the read operation and write operation described above include the following operations:

S1401. An edge word line WL n in the unprogrammed memory block is detected, and the last memory cell that has been written with data corresponds to the memory string X.

As shown in FIG. 14, the memory cell corresponding to memory string 1 in WL n is the last memory cell in the data block that has been written with data.

S1402. It is detected that the time duration in which the data has been written in WL n is greater than the time duration threshold $t_{WAIT}$. That is to say, the written time duration of the above data D6 is greater than the time duration threshold.

S1403, read the data of the memory cells corresponding to the memory string X+1 to the last memory string in WL n−1; in some examples, e.g., read the data D3 and D4 of WL n−1 in FIG. 15.

S1404, write the data in the memory cells corresponding to the memory string X+1 to the last memory string in the WL n−1 into the memory cells corresponding to the memory string X+1 to the last memory string in the WL n; in some examples, in FIG. 15, e.g., write D3 into the memory cell corresponding to WL n and memory string 2, and write D3 into the memory cell corresponding to WL n and memory string 3.

S1405, read the data in the memory cells corresponding to memory string 0 to memory string X in WL n. For example, read the data D5 and D6 of WL n in FIG. 15.

S1406, write the data in the memory cells corresponding to the memory string 0 to the memory string X in the WL n into the memory cells corresponding to the memory string 0 to the memory string X in the WL n+1; in some examples, in FIG. 15, e.g., write D5 into the memory cell corresponding to WL n+1 and memory string 0, and write D6 into the memory cell corresponding to WL n+1 and memory string 1.

Based on the implementation illustrated in the example described above, in an example, the controller 920 is further configured to: before determining the first memory cell and the second memory cell in the memory block according to the location of the third memory cell in the memory block, check whether the third memory cell in the memory block is set with a filling flag; the filling flag is to indicate that the data in the corresponding memory cell is invalid filled data; in the case that the third memory cell is not set with a filling flag, determine that the data in the third memory cell is valid data.

In the example of the present application, for the data (i.e., filled data) written into the memory cell by way of write-after-read described above, the controller 920 may store the filling flag corresponding to the memory cell, e.g., store the correspondence between the physical address of the memory cell and the filling flag, which may indicate that the data in the memory cell is filled data.

Accordingly, in the process of performing the write-after-read operation described above, the controller 920, after determining the third memory cell, may first check whether the third memory cell corresponds to the filling flag described above, e.g., the controller 920 may locally check whether there is a corresponding filling flag with the physical address of the third memory cell; if no filling flag corresponding to the third memory cell is found, it means that the data in the third memory cell is valid data, not filled data; on the contrary, if a filling flag corresponding to the third memory cell is found, it means that the data in the third memory cell is filled data.

Based on the implementation illustrated in the example described above, in an example, the controller 920 is further configured to: after the memory device 910 successfully writes the data read from the first memory cell into the second memory cell, set the filling flag for the second memory cell.

In the example of the present application, if the controller 920 finds no filling flag corresponding to the third memory cell, and determines the first memory cell and the second memory cell according to the third memory cell, and after writing the data in the first memory cell into the second memory cell by way of write-after-read, also sets a filling flag for the second memory cell, to avoid subsequent performance of unnecessary data retention performance enhancement processing on the second memory cell and improve the utilization of storage resources of the memory device.

For example, the controller 920 may locally create and save a corresponding relationship between the physical address of the second memory cell and the filling flag described above.

Based on the implementation illustrated in the example described above, in an example, the controller 920 is configured to: in a logical address to physical address mapping table, set the filling flag corresponding to the physical address of the second memory cell; or, outside the logical address to physical address mapping table, set the filling flag corresponding to the identification information of the second memory cell.

In an example of the present application, the controller 920 may use the existing local L2P mapping table to save the corresponding relationship between the second memory cell described above and the filling flag, without additionally setting an additional mapping table between the physical address of the memory cell and the filling flag, therefore, the utilization rate of buffer resources in the controller 920 is improved.

Figure 16:
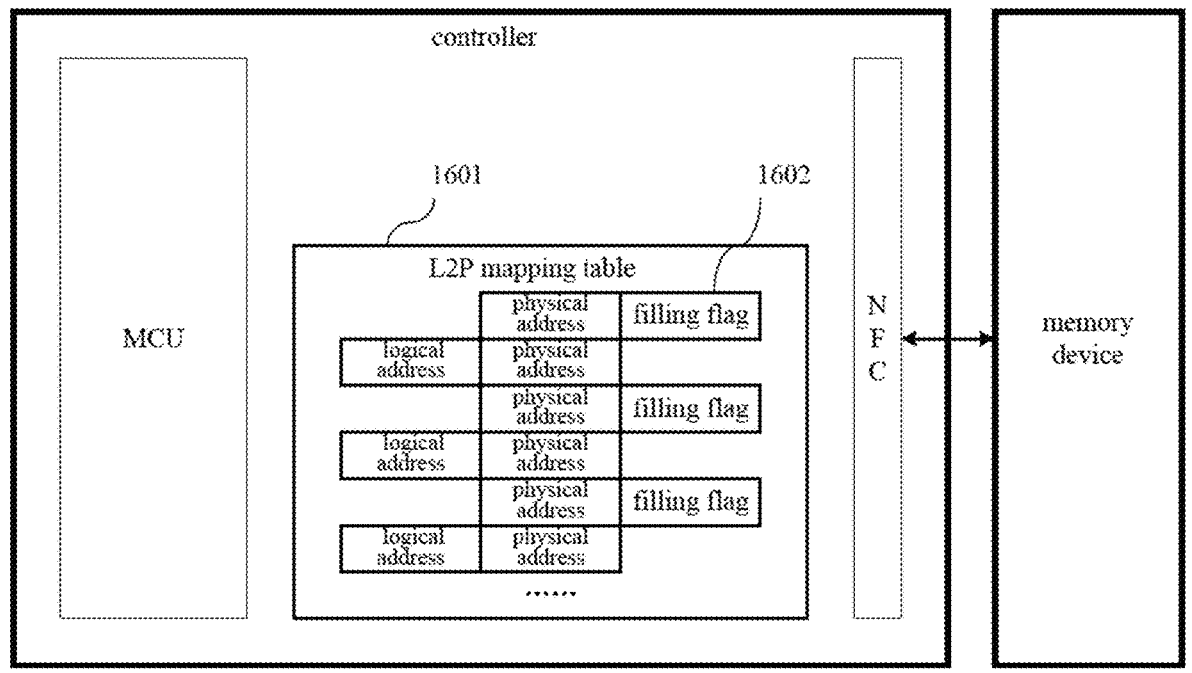
FIG. 16 is a system framework diagram involved in an example of the present application.

For example, please refer to FIG. 16, which illustrates a system framework diagram involved in an example of the present application. As shown in FIG. 16, the controller 920 is provided with an L2P mapping table 1601, after writing filled data into a memory cell by way of write-after-read described above in the example of the present application, the controller 920 sets a filling flag 1602 corresponding to the physical address of the memory cell in the L2P mapping table 1601; and when the controller 920 subsequently needs to perform a write-after-read operation on the first memory cell, the physical address corresponding to the first memory cell may be retrieved from the L2P mapping table to determine whether the physical address corresponding to the first memory cell corresponds to the filling flag 1602 in the L2P mapping table, if so, the data in the first memory cell will not be read, otherwise, the data in the first memory cell will be read and written into the second memory cell.

In an example of the present application, the controller 920 may also set up a mapping table independently in addition to the existing local mapping table to save the corresponding relationship between the second memory cell and the filling flag described above, this implementation does not require modification for the existing mapping table, thus can improve compatibility.

Figure 17:
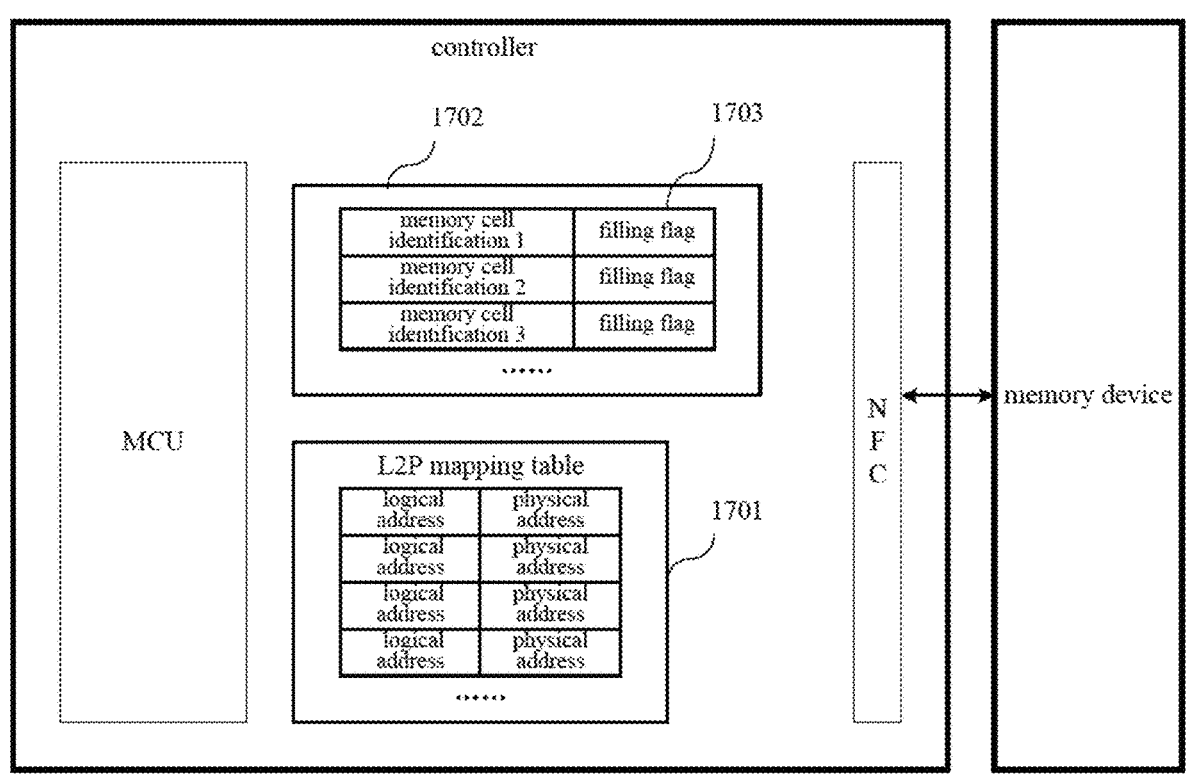
FIG. 17 is another system framework diagram involved in an example of the present application.

For example, please refer to FIG. 17, which illustrates another system framework diagram involved in an example of the present application. As shown in FIG. 17, the controller 920 is provided with an L2P mapping table 1701, and in addition to the L2P mapping table 1701, a filling flag mapping table 1702 is also provided, after writing filled data into a memory cell by way of write-after-read described above in the example of the present application, the controller 920 sets a filling flag 1703 corresponding to the identification information (e.g., physical address, number, etc.) of the memory cell in the filling flag mapping table 1702; and when the controller 920 subsequently needs to perform a write-after-read operation on the first memory cell, the physical address corresponding to the first memory cell may be retrieved from the filling flag mapping table 1702 to determine whether the physical address corresponding to the first memory cell corresponds to the filling flag

1703 in the filling flag mapping table 1702, if so, the data in the first memory cell will not be read, otherwise, the data in the first memory cell will be read and written into the second memory cell.

Based on the implementation illustrated in the example described above, in an example, the controller 920 is further configured to: when the memory block is erased, unset the filling flag corresponding to the memory cell in the memory block.

In the example of the present application, when a memory block is erased, the controller 920 may delete the corresponding relationship between the physical address corresponding to the memory cell in the memory block and the filling flag 1602 in the L2P mapping table 1601 shown in FIG. 16; or, when a memory block is erased, the controller 920 may delete the corresponding relationship between the identification information corresponding to the memory cell in the memory block and the filling flag 1703 in the filling flag mapping table 1702 shown in FIG. 17.

Through the processing described above, in an aspect, interferences caused by invalid filling flag on subsequent write-after-read operations may be avoided, in another aspect, invalid filling tags occupying buffer resources in the controller 920 may be avoided in time, thereby the utilization rate of buffer resources in the controller 920 is improved.

Please refer to FIG. 18, which is a flowchart of a method for operating a memory system provided by an illustrated example of the present application. The memory system may include a controller and a memory device, and the method for operating the memory system may be performed by the controller in the memory system. As shown in FIG. 18, the method may include the following operations.

Operation 1810: sending, by a controller, a read command to a memory device.

Operation 1820: reading, by the memory device, data stored in a first memory cell in the memory according to the read command; the first memory cell and the second memory cell are located in the same memory string, and the word lines coupled to the first memory cell and the second memory cell respectively are adjacent; the second memory cell is a memory cell that has not yet been written with data.

Operation 1830: sending, by a controller, a write command to the memory device.

Operation 1840: writing, by the memory device, data read from the first memory cell to the second memory cell according to the write command.

Based on the implementation illustrated in the example described above, in an example, before sending, by the controller, a read command to a memory device, the method further includes: obtaining, by the controller, the physical address of the first memory cell and the physical address of the second memory cell.

The sending, by the controller described above, a write command to the memory device described above includes: sending, by the controller, the read command to the memory device according to the physical address of the first memory cell.

The sending, by the controller described above, a write command to the memory device described above includes: sending, by the controller, the write command to the memory device according to the physical address of the second memory cell.

Based on the implementation illustrated in the example described above, in an example, before sending, by the controller, a read command to a memory device, the method described above further includes: in the case that the memory block is open and the data in the third memory cell in the memory block is valid data, determining, by the controller, the first memory cell in the memory block and the second memory cell corresponding to the first memory cell according to the location of the third memory cell in the memory block; wherein, the third memory cell is the last memory cell among the memory cells in the memory block that have been written with data.

Based on the implementation illustrated in the example described above, in an example, determining, by the controller described above, the first memory cell in the memory block and the second memory cell corresponding to the first memory cell according to the location of the third memory cell in the memory block, includes: in the case that the third memory cell is the last memory cell in the n-th word line of the memory block, by the controller, determining the memory cells in the n-th word line respectively as the first memory cells; determining the memory cell in the same memory string as the first memory cell in the (n+1)-th word line of the memory block as the second memory cell corresponding to the first memory cell; wherein, $1 \leq n < N$, n is an integer, and M is the number of word lines in the memory block.

Based on the implementation illustrated in the example described above, in an example, determining, by the controller described above, the first memory cell in the memory block and the second memory cell corresponding to the first memory cell according to the location of the third memory cell in the memory block, includes: in the case that the third memory cell is not the last memory cell in the n-th word line of the memory block, by the controller, determining a non-empty memory cell in the n-th word line as the first memory cell, determining the memory cell in the same memory string as the first memory cell in the (n+1)-th word line of the memory block as the second memory cell corresponding to the first memory cell; and by the controller, determining the memory cell in the n-th word line that has not yet been written with data as the second memory cell, determining the memory cell in the same memory string as the second memory cell in the (n−1)-th word line of the memory block as the first memory cell corresponding to the second memory cell; wherein, $1 \leq n < N$, n is an integer, and M is the number of word lines in the memory block.

Based on the implementation illustrated in the example described above, in an example, the method described above further includes: before determining the first memory cell and the second memory cell in the memory block according to the location of the third memory cell in the memory block, by the controller, checking whether the third memory cell in the memory block is set with a filling flag; the filling flag is to indicate that the data in the corresponding memory cell is invalid filled data; in the case that the third memory cell is not set with a filling flag, determining that the data in the third memory cell is valid data.

Based on the implementation illustrated in the example described above, in an example, the method described above further includes: after the memory device successfully writes the data read from the first memory cell into the second memory cell, setting, by the controller, the filling flag for the second memory cell.

Based on the implementation illustrated in the example described above, in an example, setting, by the controller described above, the filling flag for the second memory cell includes: in a logical address to physical address mapping table, setting, by the controller, the filling flag corresponding to the physical address of the second memory cell; or, outside the logical address to physical address mapping table, setting, by the controller, the filling flag corresponding to the identification information of the second memory cell.

Based on the implementation illustrated in the example described above, in an example, the method described above further includes: when the memory block is erased, unsetting, by the controller, the filling flag corresponding to the memory cell in the memory block.

Based on the implementation illustrated in the example described above, in an example, sending, by the controller described above, a read command to a memory device includes: in the case that the time duration in which the data has been written in the first memory cell reaches a time duration threshold, sending, by the controller described above, the read command to the memory device.

Figure 19:
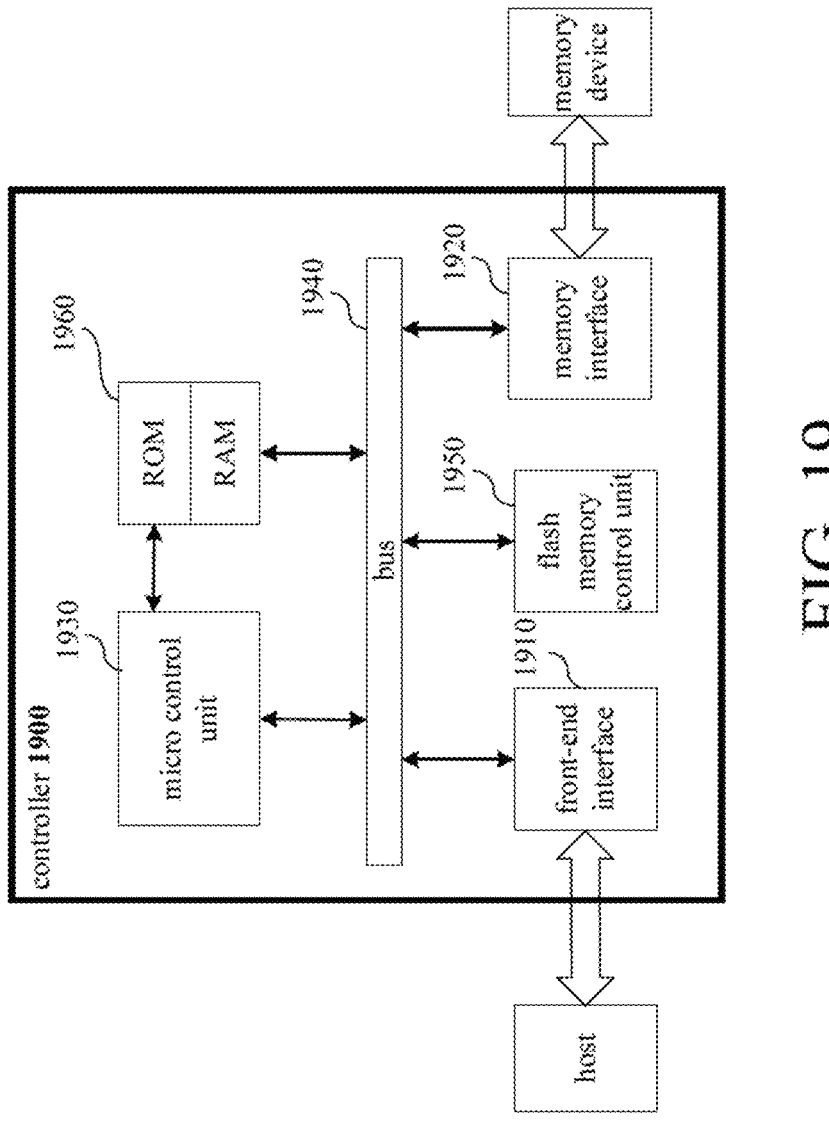
FIG. 19 is a schematic structural diagram of a controller provided by an illustrated example of the present application.

FIG. 19 is a schematic structural diagram of a controller provided by an illustrated example of the present application. As shown in FIG. 19, the controller 1900 includes a front-end interface 1910, a memory interface 1920, a micro control unit 1930, a bus 1940 and a flash memory control unit 1950.

Wherein the front-end interface 1910 may also be referred to as Host I/F, which is connected to the host and used to communicate with the host.

The memory interface 1920 is connected to the memory device (which may be a non-volatile memory device) and is to convert data exchanges on the bus into data exchanges that comply with the storage timing of the storage medium.

The micro control unit 1930 and the flash memory control unit 1950 are used to control the entire functions of the controller, control the memory interface 1920 to correctly complete data exchange between the memory device and the bus, and are responsible for the management of interrupt signal, etc. For example, the micro control unit 1930 and the flash memory control unit 1950 may be used to control functions, such as data write, data read, garbage collection, wear leveling, and error correction, etc.

Optionally, the controller 1900 may also include a memory cell 1960. Optionally, the memory cell 1960 may include Read-Only Memory (ROM) and Random Access Memory (RAM).

Wherein the read-only memory may be connected to the micro control unit 1930 and the flash memory control unit 1950, and may be used to save the firmware program, fixed configuration information, non-fixed setting data, etc., of the controller 1900.

The random access memory device may be connected to the front-end interface 1910, the memory interface 1920, the micro control unit 1930 and the flash memory control unit 1950 through the bus 1940, which may be used to buffer data exchanged between the controller 1900 and the host or memory device, and to buffer data such as a portion of configuration information of the controller 1900.

The controller 1900 described above may perform all or part of the operations performed by the controller in the method shown in FIG. 18.

The controller 1900 may include a cache (e.g., the memory cell 1960 described above) and a control circuit (e.g., one or more of the front-end interface 1910, the memory interface 1920, the micro control unit 1930, the bus 1940 and the flash memory control unit 1950 described above), wherein the control circuit is configured to: send a read command to the memory device; the read command is for instructing the memory device to read data stored in a first memory cell in the memory device; the first memory cell and the second memory cell are located in the same memory string, and the word lines coupled to the first memory cell and the second memory cell respectively are adjacent; the second memory cell is a memory cell that has not yet been written with data; send a write command to the memory; the write command is for instructing the memory device to write the data read from the first memory cell to the second memory cell.

In an example, the control circuit is further configured to obtain the physical address of the first memory cell and the physical address of the second memory cell; the control circuit is configured to send the read command to the memory device according to the physical address of the first memory cell, and to send the write command to the memory device according to the physical address of the second memory cell.

In an example, the control circuit is further configured to: before sending the read command to the memory device, in the case that the memory block is open and the data in the third memory cell in the memory block is valid data, determine the first memory cell in the memory block and the second memory cell corresponding to the first memory cell according to the location of the third memory cell in the memory block; wherein, the third memory cell is the last memory cell among the memory cells in the memory block that have been written with data.

In an example, the control circuit is configured to: in the case that the third memory cell is the last memory cell in the n-th word line of the memory block, determine the memory cells in the n-th word line respectively as the first memory cells; determine the memory cell in the same memory string as the first memory cell in the (n+1)-th word line of the memory block as the second memory cell corresponding to the first memory cell; wherein, $1 \leq n < N$, n is an integer, and M is the number of word lines in the memory block.

In an example, the control circuit is configured to: in the case that the third memory cell is not the last memory cell in the n-th word line of the memory block, determine a non-empty memory cell in the n-th word line as the first memory cell, determine the memory cell in the same memory string as the first memory cell in the (n+1)-th word line of the memory block as the second memory cell corresponding to the first memory cell; and determine the memory cell in the n-th word line that has not yet been written with data as the second memory cell, determine the memory cell in the same memory string as the second memory cell in the (n−1)-th word line of the memory block as the first memory cell corresponding to the second memory cell; wherein, $1 \leq n < N$, n is an integer, and M is the number of word lines in the memory block.

In an example, the controller is further configured to: before determining the first memory cell and the second memory cell in the memory block according to the location of the third memory cell in the memory block, check whether the third memory cell in the memory block is set with a filling flag; the filling flag is to indicate that the data in the corresponding memory cell is invalid filled data; in the case that the third memory cell is not set with a filling flag, determine that the data in the third memory cell is valid data.

In an example, the control circuit is further configured to: after the memory successfully writes the data read from the first memory cell into the second memory cell, set the filling flag for the second memory cell.

In an example, the control circuit is configured to: in a logical address to physical address mapping table, set the filling flag corresponding to the physical address of the second memory cell; or, outside the logical address to physical address mapping table, set the filling flag corresponding to the identification information of the second memory cell.

In an example, the control circuit is further configured to: when the memory block is erased, unset the filling flag corresponding to the memory cell in the memory block.

In an example, the control circuit is configured to: in the case that the time duration in which the data has been written in the first memory cell reaches a time duration threshold, send the read command to the memory device.

An example of the present application provides a computer-readable storage medium having instructions stored thereon, which run on the control logic circuit of the controller (e.g., the micro control unit and flash memory control unit described above) implement the method for operating the memory system provided by the example shown in FIG. 18. Optionally, the controller may be the controller as shown in FIG. 19, and the memory system may be the memory system as shown by diagram 900.

In the present application, the terms "first" and "second" are used for descriptive purposes only, and should not be understood as indicating or implying relative importance. Unless expressly limited otherwise, the term "at least one" refers to one or more, and the term "multiple" refers to two or more.

The term "and/or" in the present application is just an association relationship describing related objects, indicating that there may be three relationships, e.g., A and/or B may indicate three situations: A exists alone, A and B exist simultaneously, and B exists alone. Additionally, the character "/" herein generally indicates that the related objects before and after are an "or" relationship.

The present application provides a memory system, a method for operating the memory system, a controller and a storage medium, which may improve the data retention performance of edge word lines in data blocks not fully written with data. The technical solution is as follows:

In an aspect, a memory system is provided, wherein the memory system includes: a memory device and a controller; the controller is configured to send a read command to the memory device; the memory device is configured to read data stored in a first memory cell in the memory device according to the read command; the first memory cell and the second memory cell are located in the same memory string, and the word lines coupled to the first memory cell and the second memory cell respectively are adjacent; the second memory cell is a memory cell that has not yet been written with data; the controller is further configured to send a write command to the memory device; the memory device is further configured to write data read from the first memory cell to the second memory cell according to the write command.

In an example, the controller is further configured to obtain the physical address of the first memory cell and the physical address of the second memory cell; the controller is configured to send the read command to the memory device according to the physical address of the first memory cell, and send the write command to the memory device according to the physical address of the second memory cell.

In an example, the controller is further configured to: before sending the read command to the memory device, in the case that the memory block is open and the data in the third memory cell in the memory block is valid data, determine the first memory cell in the memory block and the second memory cell corresponding to the first memory cell according to the location of the third memory cell in the memory block; wherein, the third memory cell is the last memory cell among the memory cells in the memory block that have been written with data.

In an example, the controller is configured to: in the case that the third memory cell is the last memory cell in the n-th word line of the memory block, determine the memory cells in the n-th word line respectively as the first memory cells; determine the memory cell in the same memory string as the first memory cell in the (n+1)-th word line of the memory block as the second memory cell corresponding to the first memory cell; wherein, $1 \leq n < N$, n is an integer, and M is the number of word lines in the memory block.

In an example, the controller is configured to: in the case that the third memory cell is not the last memory cell in the n-th word line of the memory block, determine a non-empty memory cell in the n-th word line as the first memory cell, determine the memory cell in the same memory string as the first memory cell in the (n+1)-th word line of the memory block as the second memory cell corresponding to the first memory cell; and determine the memory cell in the n-th word line that has not yet been written with data as the second memory cell, determine the memory cell in the same memory string as the second memory cell in the (n−1)-th word line of the memory block as the first memory cell corresponding to the second memory cell; wherein, $1 \leq n < N$, n is an integer, and M is the number of word lines in the memory block.

In an example, the controller is further configured to: before determining the first memory cell and the second memory cell in the memory block according to the location of the third memory cell in the memory block, check whether the third memory cell in the memory block is set with a filling flag; the filling flag is to indicate that the data in the corresponding memory cell is invalid filled data; in the case that the third memory cell is not set with a filling flag, determine that the data in the third memory cell is valid data.

In an example, the controller is further configured to: after the memory device successfully writes the data read from the first memory cell into the second memory cell, set the filling flag for the second memory cell.

In an example, the controller is configured to: in a logical address to physical address mapping table, set the filling flag corresponding to the physical address of the second memory cell; or, outside the logical address to physical address mapping table, set the filling flag corresponding to the identification information of the second memory cell.

In an example, the controller is further configured to: when the memory block is erased, unset the filling flag corresponding to the memory cell in the memory block.

In an example, the controller is configured to: in the case that the time duration in which the data has been written in the first memory cell reaches a time duration threshold, send the read command to the memory device.

In another aspect, a method for operating a memory system is provided, including: sending, by a controller, a read command to a memory device; reading, by the memory device, data stored in a first memory cell in the memory device according to the read command; the first memory cell and the second memory cell are located in the same memory string, and the word lines coupled to the first memory cell and the second memory cell respectively are adjacent; the second memory cell is a memory cell that has not yet been written with data; sending, by the controller, a write command to the memory device; writing, by the memory device, data read from the first memory cell to the second memory cell according to the write command.

In an example, before sending, by the controller, a read command to a memory device, the method further includes: obtaining, by the controller, the physical address of the first memory cell and the physical address of the second memory cell; sending, by the controller, a write command to the memory device including: sending, by the controller, the read command to the memory device according to the physical address of the first memory cell; sending, by the controller, a write command to the memory device including: sending, by the controller, the write command to the memory device according to the physical address of the second memory cell.

In an example, before sending, by the controller, the read command to the memory device, the method further includes: in the case that the memory block is open and the data in the third memory cell in the memory block is valid data, determining, by the controller, the first memory cell in the memory block and the second memory cell corresponding to the first memory cell according to the location of the third memory cell in the memory block; wherein, the third memory cell is the last memory cell among the memory cells in the memory block that have been written with data.

In an example, determining, by the controller, the first memory cell in the memory block and the second memory cell corresponding to the first memory cell according to the location of the third memory cell in the memory block, includes: in the case that the third memory cell is the last memory cell in the n-th word line of the memory block, determining, by the controller, the memory cells in the n-th word line respectively as the first memory cells; determining the memory cell in the same memory string as the first memory cell in the (n+1)-th word line of the memory block as the second memory cell corresponding to the first memory cell; wherein, $1 \leq n < N$, n is an integer, and M is the number of word lines in the memory block.

In an example, determining, by the controller, the first memory cell in the memory block and the second memory cell corresponding to the first memory cell according to the location of the third memory cell in the memory block, includes: in the case that the third memory cell is not the last memory cell in the n-th word line of the memory block, determining, by the controller, a non-empty memory cell in the n-th word line as the first memory cell, determining the memory cell in the same memory string as the first memory cell in the (n+1)-th word line of the memory block as the second memory cell corresponding to the first memory cell; and by the controller, determining the memory cell in the n-th word line that has not yet been written with data as the second memory cell, determining the memory cell in the same memory string as the second memory cell in the (n−1)-th word line of the memory block as the first memory cell corresponding to the second memory cell; wherein, $1 \leq n < N$, n is an integer, and M is the number of word lines in the memory block.

In an example, the method further includes: before determining the first memory cell and the second memory cell in the memory block according to the location of the third memory cell in the memory block, by the controller, checking whether the third memory cell in the memory block is set with a filling flag; the filling flag is to indicate that the data in the corresponding memory cell is invalid filled data; in the case that the third memory cell is not set with a filling flag, determining that the data in the third memory cell is valid data.

In an example, the method further includes: after the memory device successfully writes the data read from the first memory cell into the second memory cell, setting, by the controller, the filling flag for the second memory cell.

In an example, setting, by the controller, the filling flag for the second memory cell includes: in a logical address to physical address mapping table, setting, by the controller, the filling flag corresponding to the physical address of the second memory cell; or, outside the logical address to physical address mapping table, setting, by the controller, the filling flag corresponding to the identification information of the second memory cell.

In an example, the method further includes: when the memory block is erased, unsetting, by the controller, the filling flag corresponding to the memory cell in the memory block.

In an example, sending, by the controller, a read command to a memory device includes: in the case that the time duration in which the data has been written in the first memory cell reaches a time duration threshold, sending, by the controller, the read command to the memory device.

In another aspect, a controller is provided, wherein the controller includes a cache and a control circuit, and the control circuit is configured to: send a read command to a memory device; the read command is for instructing the memory device to read data stored in a first memory cell in the memory device; the first memory cell and the second memory cell are located in the same memory string, and the word lines coupled to the first memory cell and the second memory cell respectively are adjacent; the second memory cell is a memory cell that has not yet been written with data; send a write command to the memory device; the write command is for instructing the memory device to write the data read from the first memory cell to the second memory cell.

In an example, the control circuit is further configured to obtain the physical address of the first memory cell and the physical address of the second memory cell; the control circuit is configured to send the read command to the memory device according to the physical address of the first memory cell, and to send the write command to the memory device according to the physical address of the second memory cell.

In an example, the control circuit is further configured to: before sending the read command to the memory device, in the case that the memory block is open and the data in the third memory cell in the memory block is valid data, determine the first memory cell in the memory block and the second memory cell corresponding to the first memory cell according to the location of the third memory cell in the memory block; wherein, the third memory cell is the last memory cell among the memory cells in the memory block that have been written with data.

In an example, the control circuit is configured to: in the case that the third memory cell is the last memory cell in the n-th word line of the memory block, determine the memory cells in the n-th word line respectively as the first memory cells; determine the memory cell in the same memory string as the first memory cell in the (n+1)-th word line of the memory block as the second memory cell corresponding to the first memory cell; wherein, $1 \le n < N$, n is an integer, and M is the number of word lines in the memory block.

In an example, the control circuit is configured to: in the case that the third memory cell is not the last memory cell in the n-th word line of the memory block, determine a non-empty memory cell in the n-th word line as the first memory cell, determine the memory cell in the same memory string as the first memory cell in the (n+1)-th word line of the memory block as the second memory cell corresponding to the first memory cell; and determine the memory cell in the n-th word line that has not yet been written with data as the second memory cell, determine the memory cell in the same memory string as the second memory cell in the (n−1)-th word line of the memory block as the first memory cell corresponding to the second memory cell; wherein, $1 \le n < N$, n is an integer, and M is the number of word lines in the memory block.

In an example, the controller is further configured to: before determining the first memory cell and the second memory cell in the memory block according to the location of the third memory cell in the memory block, check whether the third memory cell in the memory block is set with a filling flag; the filling flag is to indicate that the data in the corresponding memory cell is invalid filled data; in the case that the third memory cell is not set with a filling flag, determine that the data in the third memory cell is valid data.

In an example, the control circuit is further configured to: after the memory device successfully writes the data read from the first memory cell into the second memory cell, set the filling flag for the second memory cell.

In an example, the control circuit is configured to: in a logical address to physical address mapping table, set the filling flag corresponding to the physical address of the second memory cell; or, outside the logical address to physical address mapping table, set the filling flag corresponding to the identification information of the second memory cell.

In an example, the control circuit is further configured to: when the memory block is erased, unset the filling flag corresponding to the memory cell in the memory block.

In an example, the control circuit is configured to: in the case that the time duration in which the data has been written in the first memory cell reaches a time duration threshold, send the read command to the memory device.

In another aspect, a computer readable storage media is provided, wherein the computer readable storage medium stores instructions, which run on a controller in the memory system, implement the method for operating the memory system of any one of the examples described above.

The technical solution provided by the present application may include the following beneficial effects:

For an open memory string in the memory device, if the first memory cell in the memory string has been written with data, and the second memory cell adjacent to the first memory cell in the memory string has not been written with data, at this point, the word line at which the first memory cell is located is the edge word line, and in the example of the present application, the data in the first memory cell may be read out by way of write-after-read, and then written into the second memory cell, thus, the same data may be stored in the first memory cell and the second memory cell, that is, the first memory cell and the second memory cell may be in the same program state, therefore, the phenomenon of electron lateral migration between the first memory cell and the memory cell may be suppressed, thereby improving the data retention performance of the first memory cell, that is, improving the data retention performance of the edge word line.

The above description is only an illustrated example of the application, and is not intended to limit the application, and any modification, equivalent replacement and improvement, etc., made within the spirit and principles of the present application shall be included within the protection scope of the present application.

What is claimed is:

1. A memory system, comprising:
   a controller configured to: send a read command to a memory device; and
   the memory device configured to: read data stored in a first memory cell in the memory device according to the read command; wherein the first memory cell and a second memory cell are located in a same memory string, and word lines coupled to the first memory cell and the second memory cell respectively are adjacent, the second memory cell is a memory cell that has not yet been written with data;

the controller is further configured to send a write command to the memory device; and the memory device is further configured to write data read from the first memory cell to the second memory cell according to the write command.

2. The memory system of claim 1, wherein the controller is further configured to obtain a physical address of the first memory cell and a physical address of the second memory cell; and the controller is configured to send the read command to the memory device according to the physical address of the first memory cell, and send the write command to the memory device according to the physical address of the second memory cell.

3. The memory system of claim 1, wherein the controller is further configured to:

before sending the read command to the memory device, in response to a memory block being open and data in a third memory cell in the memory block being valid data, determine the first memory cell in the memory block and the second memory cell corresponding to the first memory cell according to a location of the third memory cell in the memory block, wherein, the third memory cell is a last memory cell among the memory cells in the memory block that have been written with data.

4. The memory system of claim 3, wherein the controller is configured to:

in response to the third memory cell being the last memory cell in a n-th word line of the memory block, determine memory cells in the n-th word line respectively as the first memory cells, and determine a memory cell in the same memory string as the first memory cell in the (n+1)-th word line of the memory block as the second memory cell corresponding to the first memory cell; and wherein, $1 \leq n < N$, n is an integer, and M is the number of word lines in the memory block.

5. The memory system of claim 3, wherein the controller is configured to:

in response to the third memory cell not being the last memory cell in the n-th word line of the memory block, determine a non-empty memory cell in the n-th word line as the first memory cell, and determine a memory cell in the same memory string as the first memory cell in the (n+1)-th word line of the memory block as the second memory cell corresponding to the first memory cell; and determine the memory cell in the n-th word line that has not yet been written with data as the second memory cell, and determine a memory cell in the same memory string as the second memory cell in a (n−1)-th word line of the memory block as the first memory cell corresponding to the second memory cell, wherein, $1 \leq n < N$, n is an integer, and M is the number of word lines in the memory block.

6. The memory system of claim 3, wherein the controller is further configured to:

before determining the first memory cell and the second memory cell in the memory block according to the location of the third memory cell in the memory block, check whether the third memory cell in the memory block is set with a filling flag, wherein the filling flag is to indicate that data in a corresponding memory cell is invalid filled data; and in response to the third memory cell not being set with a filling flag, determine that data in the third memory cell is valid data.

7. The memory system of claim 6, wherein the controller is further configured to:

after the memory device successfully writes the data read from the first memory cell into the second memory cell, set the filling flag for the second memory cell.

8. The memory system of claim 7, wherein the controller is configured to:

in a logical address to physical address mapping table, set the filling flag corresponding to the physical address of the second memory cell; or outside the logical address to physical address mapping table, set the filling flag corresponding to identification information of the second memory cell.

9. The memory system of claim 7, wherein the controller is further configured to:

when the memory block is erased, unset a filling flag corresponding to a memory cell in the memory block.

10. The memory system of claim 1, wherein the controller is configured to:

in the case that a time duration in which data has been written in the first memory cell reaches a time duration threshold, send the read command to the memory device.

11. A method for operating a memory system, comprising:

sending, by a controller, a read command to a memory device;

reading, by the memory device, data stored in a first memory cell in the memory device according to the read command; wherein the first memory cell and a second memory cell are located in a same memory string, and word lines coupled to the first memory cell and the second memory cell respectively are adjacent, and the second memory cell is a memory cell that has not yet been written with data;

sending, by the controller, a write command to the memory device; and writing, by the memory device, data read from the first memory cell to the second memory cell according to the write command.

12. The method of claim 11, wherein before sending, by the controller, a read command to a memory device, the method further comprises:

obtaining, by the controller, a physical address of the first memory cell and a physical address of the second memory cell;

the sending, by the controller, a write command to the memory device comprising:

sending, by the controller, the read command to the memory device according to the physical address of the first memory cell; and the sending, by the controller, a write command to the memory device comprising:

sending, by the controller, the write command to the memory device according to the physical address of the second memory cell.

13. The method of claim 11, wherein before sending, by the controller, the read command to the memory device, the method further comprises:

in the case that the memory block is open and data in a third memory cell in the memory block is valid data, determining, by the controller, the first memory cell in the memory block and the second memory cell corresponding to the first memory cell according to a location of the third memory cell in the memory block; and wherein, the third memory cell is a last memory cell among the memory cells in the memory block that have been written with data.

14. The method of claim 13, wherein, the determining, by the controller, the first memory cell in the memory block and the second memory cell corresponding to the first memory cell according to the location of the third memory cell in the memory block comprises:

in the case that the third memory cell is a last memory cell in the n-th word line of the memory block, by the controller, determining memory cells in the n-th word line respectively as the first memory cells, and determining a memory cell in the same memory string as the first memory cell in the (n+1)-th word line of the memory block as the second memory cell corresponding to the first memory cell; and wherein, $1 \leq n < N$, n is an integer, and M is the number of word lines in the memory block.

15. The method of claim 13, wherein, the determining, by the controller, the first memory cell in the memory block and the second memory cell corresponding to the first memory cell according to the location of the third memory cell in the memory block comprises:

in the case that the third memory cell is not the last memory cell in the n-th word line of the memory block, by the controller, determining a non-empty memory cell in the n-th word line as the first memory cell, and determining a memory cell in the same memory string as the first memory cell in the (n+1)-th word line of the memory block as the second memory cell corresponding to the first memory cell; and by the controller, determining a memory cell in the n-th word line that has not yet been written with data as the second memory cell, and determining a memory cell in the same memory string as the second memory cell in the (n−1)-th word line of the memory block as the first memory cell corresponding to the second memory cell, wherein, $1 \leq n < N$, n is an integer, and M is the number of word lines in the memory block.

16. The method of claim 13, further comprises:

before determining the first memory cell and the second memory cell in the memory block according to the location of the third memory cell in the memory block, by the controller, checking whether the third memory cell in the memory block is set with a filling flag, wherein the filling flag is to indicate that the data in a corresponding memory cell is invalid filled data; and in the case that the third memory cell is not set with a filling flag, determining that data in the third memory cell is valid data.

17. The method of claim 16, further comprises:

after the memory device successfully writes the data read from the first memory cell into the second memory cell, setting, by the controller, the filling flag for the second memory cell.

18. The method of claim 17, wherein the setting, by the controller, the filling flag for the second memory cell comprises:

in a logical address to physical address mapping table, setting, by the controller, the filling flag corresponding to the physical address of the second memory cell; or outside the logical address to physical address mapping table, setting, by the controller, the filling flag corresponding to identification information of the second memory cell.

19. The method of claim 17, further comprises:

when the memory block is erased, unsetting, by the controller, a filling flag corresponding to a memory cell in the memory block.

20. A controller, comprising:

a cache; and a control circuit configured to:

send a read command to a memory device; wherein the read command is for instructing the memory device to read data stored in a first memory cell in the memory device, and the first memory cell and a second memory cell are located in a same memory string, and word lines coupled to the first memory cell and the second memory cell respectively are adjacent, the second memory cell is a memory cell that has not yet been written with data; and send a write command to the memory device; wherein the write command is for instructing the memory device to write the data read from the first memory cell to the second memory cell.

* * * * *